US012264816B2

(12) United States Patent
Yoshida et al.

(10) Patent No.: US 12,264,816 B2
(45) Date of Patent: Apr. 1, 2025

(54) LIGHT SOURCE DEVICE

(71) Applicant: NICHIA CORPORATION, Anan (JP)

(72) Inventors: Norimasa Yoshida, Komatsushima (JP); Shinya Matsuoka, Anan (JP); Yuta Oka, Awa (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/592,666

(22) Filed: Mar. 1, 2024

(65) Prior Publication Data

US 2024/0200754 A1 Jun. 20, 2024

Related U.S. Application Data

(63) Continuation of application No. 17/713,727, filed on Apr. 5, 2022, now Pat. No. 11,946,637.

(30) Foreign Application Priority Data

Apr. 5, 2021 (JP) ................................ 2021-064355
Jan. 12, 2022 (JP) ................................ 2022-003186

(51) Int. Cl.
*F21V 5/04* (2006.01)
*F21V 5/00* (2018.01)

(52) U.S. Cl.
CPC .............. *F21V 5/045* (2013.01); *F21V 5/007* (2013.01)

(58) Field of Classification Search
CPC ....................................................... F21V 5/045
See application file for complete search history.

(56) References Cited

U.S. PATENT DOCUMENTS

| | | | | |
|---|---|---|---|---|
| 11,005,006 | B2 | 5/2021 | Kim et al. | |
| 2017/0023211 | A1* | 1/2017 | Sepkhanov | F21V 5/005 |
| 2017/0249501 | A1 | 8/2017 | Van Der Sijde et al. | |
| 2018/0324343 | A1 | 11/2018 | Van Der Sijde et al. | |
| 2019/0280174 | A1 | 9/2019 | Okahisa et al. | |

(Continued)

FOREIGN PATENT DOCUMENTS

| | | |
|---|---|---|
| JP | 2006-173271 A | 6/2006 |
| JP | 2008-122463 A | 5/2008 |

(Continued)

OTHER PUBLICATIONS

Final Office Action in U.S. Appl. No. 17/713,727 dated Sep. 1, 2023.

(Continued)

*Primary Examiner* — Christopher E Dunay
(74) *Attorney, Agent, or Firm* — Foley & Lardner LLP

(57) ABSTRACT

A light source device includes: a combined body comprising light emitting portions including: a first light emitting portion comprising a first light emitting element, and a second light emitting portion provided separately from and along an outer periphery of the first light emitting portion in a plan view, the second light emitting portion comprising a plurality of second light emitting elements; and a lens disposed above the combined body. The first light emitting element and the plurality of second light emitting elements are arrayed in first and second directions that are perpendicular to each other. The first light emitting element and the plurality of second light emitting elements are controllable to be lit independently.

20 Claims, 19 Drawing Sheets

(56) References Cited

U.S. PATENT DOCUMENTS

| | | | |
|---|---|---|---|
| 2019/0383465 | A1 | 12/2019 | Van Der Sijde et al. |
| 2020/0066944 | A1 | 2/2020 | Lee et al. |
| 2020/0154027 | A1 | 5/2020 | Van Der Sijde et al. |
| 2020/0259987 | A1 | 8/2020 | Van Der Sijde et al. |
| 2020/0365781 | A1 | 11/2020 | Okahisa et al. |
| 2021/0195706 | A1* | 6/2021 | Vissenberg ............... F21S 8/04 |
| 2021/0219394 | A1* | 7/2021 | van der Sijde ........ H05B 45/10 |
| 2022/0014607 | A1 | 1/2022 | Pilnik et al. |
| 2022/0046162 | A1 | 2/2022 | Van Der Sijde et al. |
| 2022/0094836 | A1 | 3/2022 | Van Der Sijde et al. |
| 2022/0146074 | A1* | 5/2022 | Kiba .................. G02B 19/0066 |
| 2022/0146079 | A1* | 5/2022 | Tamma ................... F21V 14/06 |
| 2022/0196230 | A1 | 6/2022 | Matsuda |
| 2022/0225487 | A1* | 7/2022 | De Best ............... H05B 47/155 |
| 2023/0266639 | A1 | 8/2023 | Van Der Sijde et al. |

FOREIGN PATENT DOCUMENTS

| | | | |
|---|---|---|---|
| JP | 2013-186267 | A | 9/2013 |
| JP | 2014-082236 | A | 5/2014 |
| JP | 2016-170912 | A | 9/2016 |
| JP | 2019-502294 | A | 1/2019 |
| JP | 2019-160780 | A | 9/2019 |
| JP | 2020-506502 | A | 2/2020 |
| JP | 2021-072207 | A | 5/2021 |

OTHER PUBLICATIONS

Non-Final Office Action in U.S. Appl. No. 17/713,727 dated Mar. 20, 2023.

* cited by examiner

LIGHT SOURCE DEVICE

CROSS-REFERENCE TO RELATED PATENT APPLICATIONS

This application is a continuation of U.S. patent application Ser. No. 17/713,727, filed Apr. 5, 2022, which claims priority under 35 U.S.C. § 119 to Japanese Patent Application No. 2021-064355, filed Apr. 5, 2021, and Japanese Patent Application No. 2022-003186, filed Jan. 12, 2022. The entire disclosures of Japanese Patent Application No. 2021-064355, Japanese Patent Application No. 2022-003186, and U.S. patent application Ser. No. 17/713,727 are incorporated by reference herein.

BACKGROUND

The present disclosure relates to light source devices.

Japanese Patent Publication JP-2014-082236 A discloses a LED light emitting device including a first light emitting portion and a second light emitting portion on a circuit board, each having a group of LED elements and being formed concentrically, and a lens above the first and second light emitting portions. In the LED light emitting device, the first and second light emitting portions are driven to be independently lit.

SUMMARY

It is an object of the present disclosure to provide a light source device in which a plurality of light emitting elements are lit individually and that has two or more patterns of light distribution.

A light source device according to one embodiment of the present disclosure includes: a combined body including light emitting portions including a first light emitting portion including a first light emitting element, and a second light emitting portion provided separately from and along an outer periphery of the first light emitting portion in a plan view, the second light emitting portion including a plurality of second light emitting elements; and a lens disposed above the combined body. The first light emitting element and the plurality of second light emitting elements are arrayed in first and second directions that are perpendicular to each other, the first light emitting element and the plurality of second light emitting elements are controllable to be lit independently, and a full angle at half maximum of light distribution of light emitted from the first light emitting portion and exiting from the lens is different from a full angle at half maximum of light distribution of light emitted from the second light emitting portion and exiting from the lens.

A light source device according to one embodiment of the present disclosure includes: a combined body including light emitting portions including a first light emitting portion including a first light emitting element, and a second light emitting portion including a second light emitting element; and a lens disposed above the combined body. The second light emitting portion is disposed separately from and along an outer periphery of the first light emitting portion and includes one second light emitting element, in a plan view.

According to certain embodiments of the present disclosure, it is possible to provide a light source device in which a plurality of light emitting elements are lit individually and that has two or more patterns of light distribution.

DETAILED DESCRIPTION

Light Source Device

Figure 1A:
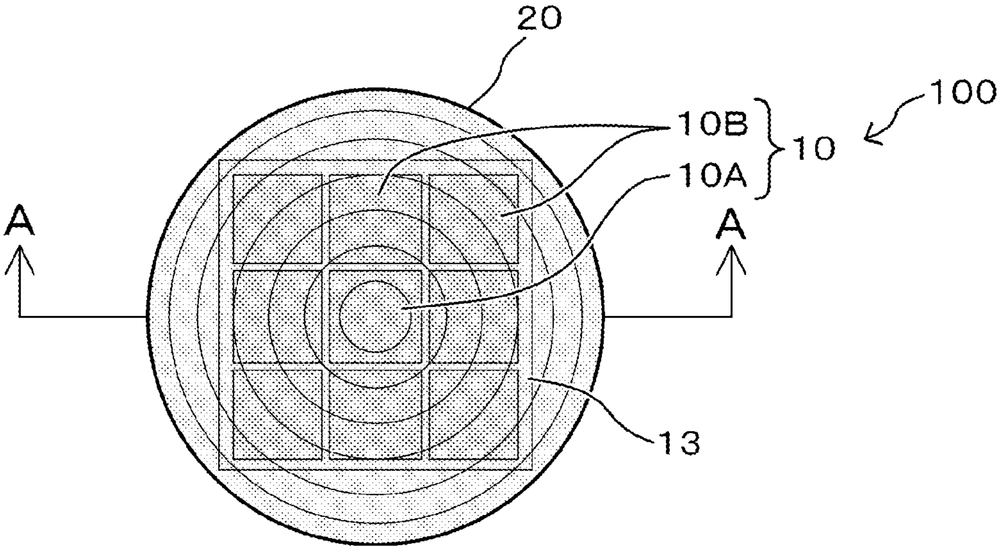
FIG. 1A is a schematic plan view illustrating a configuration of a light source device of a first embodiment.

Light source devices according to embodiments of the present invention will be described below with reference to the accompanying drawings.

The embodiments described below embody the technical concepts of the present invention, but the present invention is not limited to those embodiments unless specifically stated. Throughout the drawings, members having the same function may be denoted by the same reference character. For the sake of convenience and ease of explanation or understanding of the main points, the description below may be separately made for each embodiment, but the configurations of different embodiments can be partially substituted or combined. In the following embodiments, descriptions about matters common to previously described embodiments will be omitted, and thus, only differences therebetween will be described. In particular, similar actions and effects with similar configurations will not be mentioned sequentially for each embodiment. The size, positional relationship, etc., of members illustrated in the figures may be exaggerated for clarity of explanation. The term "end view" may be used herein to refer to a cross sectional view illustrating only a cut plane.

First Embodiment

Figure 1B:
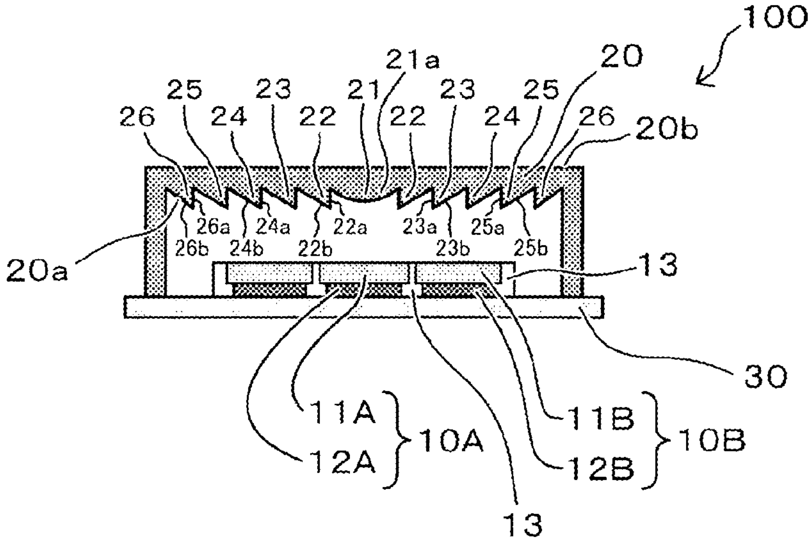
FIG. 1B is an end view taken along line A-A in FIG. 1A, schematically illustrating the configuration of the light source device of the first embodiment.
Figure 2A:
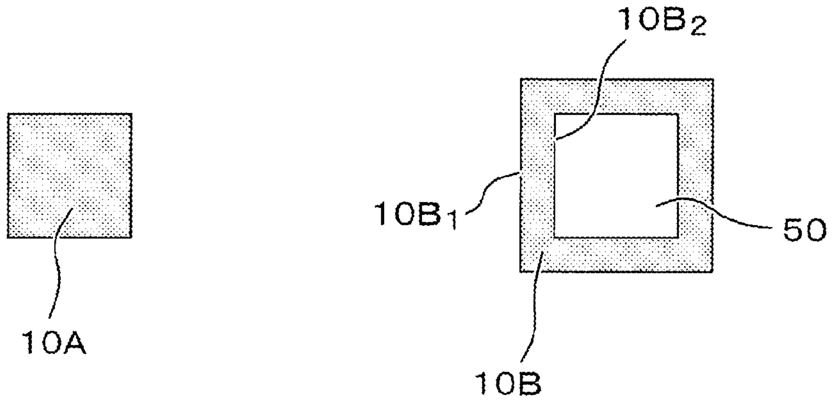
FIG. 2A is a plan view schematically illustrating each of a first light emitting portion and a second light emitting portion in the light source device of the first embodiment.
Figure 3A:
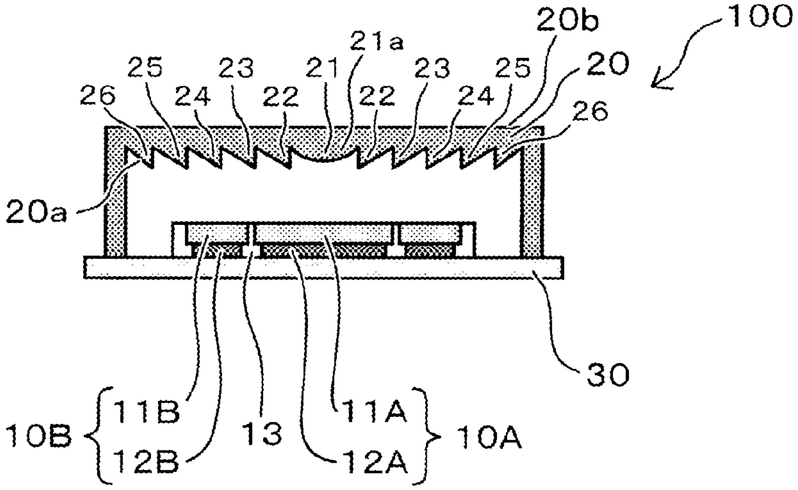
FIG. 3A is an end view schematically illustrating an embodiment of the combined body (including the first light emitting portion and the second light emitting portion) before light emission.
Figure 3B:
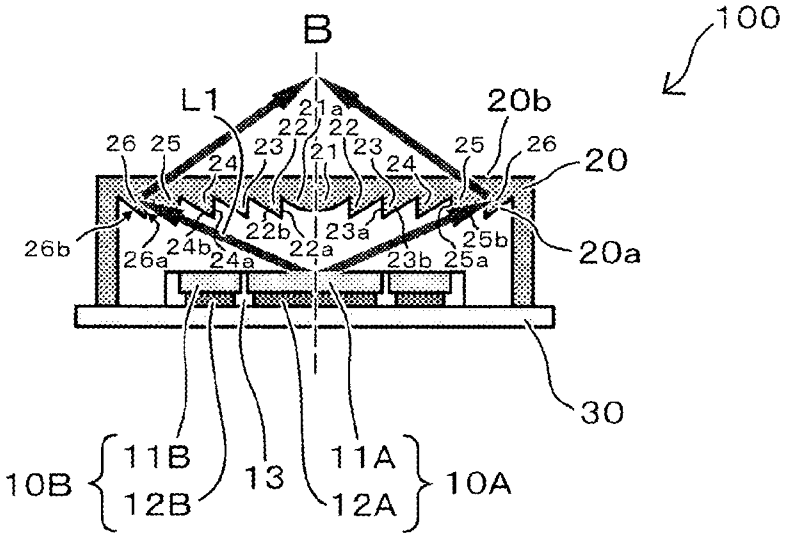
FIG. 3B is an end view schematically illustrating an embodiment upon light emission of the first light emitting portion.
Figure 3C:
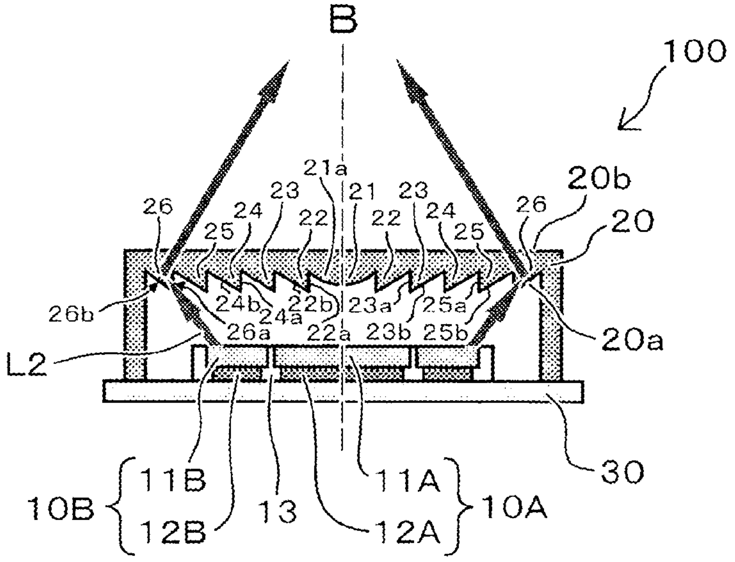
FIG. 3C is an end view schematically illustrating an embodiment upon light emission of the second light emitting portion.

FIG. 1A is a plan view schematically illustrating a configuration of a light source device of a first embodiment. FIG. 1B is an end view taken along line A-A in FIG. 1A, schematically illustrating the configuration of the light source device of the first embodiment. FIG. 2A is a plan view schematically illustrating each of a first light emitting portion and a second light emitting portion in the light source device of the first embodiment. FIG. 3A is an end view schematically illustrating an embodiment of a combined body including light emitting portions (including the first light emitting portion and the second light emitting portion) before light emission. FIG. 3B is an end view schematically illustrating an embodiment upon light emission of the first light emitting portion. FIG. 3C is an end view schematically illustrating an embodiment upon light emission of the second light emitting portion.

A light source device 100 of the first embodiment includes a combined body including light emitting portions 10 and a lens 20. The combined body 10 includes a first light emitting portion 10A including at least one first light emitting element 12A, and a second light emitting portion 10B that is provided separately from and along the outer periphery of the first light emitting portion 10A in the plan view, the second light emitting portion 10B including a plurality of second light emitting elements 12B. The combined body 10 is configured by combining the first light emitting portion 10A with the second light emitting portion 10B together with each other. The lens 20 is disposed above the combined body 10. The first light emitting element 12A and the plurality of second light emitting elements 12B are arrayed longitudinally and laterally (i.e., in first and second directions that are perpendicular to each other), and are controllable to be lit independently. A full angle at half maximum of a light distribution of light emitted from the first light emitting portion 10A and exiting from the lens 20 is different from a full angle at half maximum of a light distribution of light emitted from the second light emitting portion 10B and exiting from the lens 20. The light source device of the first embodiment can be suitably used as a flash light source.

As used herein, the "combined body comprising or including light emitting portions" means a structure of a single configuration as a whole, comprising two or more light emitting portions that are combined together with each other. The lens 20 herein includes a Fresnel lens. The "Fresnel lens" is a type of collimating lens and has a directivity in which the light emitted from a light emitting portion is refracted toward a desired irradiation area.

As mentioned below, the first light emitting portion 10A and the second light emitting portion 10B each include a light emitting element such as a Light Emitting Diode (LED), for example. The light emitted from the first and second light emitting portions 10A and 10B has light distribution intensity characteristics (called a Lambertian distribution or a Lambertian light distribution) in which a light intensity in a direction a normal line to a light emitting surface becomes maximum and the light intensity gradually decreases as an inclination of a light ray from the normal line to the surface increases. The light distribution of the light exiting from the lens as used herein includes four major patterns, namely, a ultra-wide angle light distribution, a wide angle light distribution, a ultra-narrow angle light distribution, and a narrow angle light distribution. The "wide angle light distribution" means a light distribution with a full angle at half maximum that is greater than the full angle at half maximum in normal time of the light source device on an assumption that the full angle at half maximum of the Lambertian light distribution of the first light emitting portion is the full angle at half maximum in the normal time. The "ultra-wide angle light distribution" means a light distribution with a full angle at half maximum that is even greater than the full angle at half maximum in the normal time (i.e., a full angle at half maximum that is greater than the full angle at half maximum during the wide angle light distribution) on the assumption that the full angle at half maximum of the Lambertian light distribution of the first light emitting portion is the full angle at half maximum in the normal time. The phrase "narrow angle light distribution" means a light distribution with a full angle at half maximum that is smaller than the full angle at half maximum in the normal time on the assumption that the full angle at half maximum of the Lambertian light distribution of the first light emitting portion is the full angle at half maximum in the normal time. The "ultra-narrow angle light distribution" means a light distribution with a full angle at half maximum that is even smaller than the full angle at half maximum in the normal time (i.e., a full angle at half maximum that is smaller than the full angle at half maximum during the narrow angle light distribution) on the assumption that the full angle at half maximum of the Lambertian light distribution of the first light emitting portion is the full angle at half maximum in the normal time. The fact that the full angle at half maximum of the light distribution of the light emitted from the first light emitting portion 10A and exiting from the lens 20 is different from that of the light emitted from the second light emitting portion 10B and exiting from the lens 20 means that the light emitted from the first light emitting portion 10A and exiting from the lens 20 and the light emitted from the second light emitting portion 10B and exiting from the lens 20 have a full angle at half maximum of light distribution different from each other among the above four patterns of light distribution. In a case of the wide angle light distribution control and the ultra-wide angle light distribution control, under a condition that the full angle at half maximum of the light distribution of the light emitted from the second light emitting portion 10B and exiting from the lens 20 is greater than the full angle at half maximum in normal time, the full angle at half maximum of the light distribution of the light emitted from the first light emitting portion 10A and exiting from the lens 20 may be greater than the full angle at half maximum of the light distribution of the light emitted from the second light emitting portion 10B and exiting from the lens 20. In a case of narrow angle light distribution control and ultra-narrow angle light distribution control, under a condition that the full angle at half maximum of the light distribution of the light emitted from the second light emitting portion 10B and exiting from the lens 20 is less than the full angle at half maximum in normal time, the full angle at half maximum of the light distribution of the light emitted from the first light emitting portion 10A and exiting from the lens 20 may be less than the full angle at half maximum of the light distribution of the light emitted from the second light emitting portion 10B and exiting from the lens 20.

In the light source device 100 of the first embodiment, one lens 20 enables the light distribution of the light emitted from the first light emitting portion 10A and that of the light emitted from the second light emitting portion 10B to be controlled without using two or more lenses. Thus, it is possible to realize two or more patterns of light distribution using one lens 20.

The lens 20 is disposed above the combined body 10 to span the first light emitting portion 10A and the second light emitting portion 10B. Specifically, exactly one lens 20 is disposed above exactly one combined body 10. In other words, exactly one combined body is disposed below exactly one lens. That is, the first light emitting portion 10A and the second light emitting portion 10B (corresponding to the combined body 10) are disposed within an area of one lens 20 in the plan view. In other words, the combined body 10 including two or more light emitting portions shares one lens 20. By way of example, one combined body 10 is disposed within an area of one Fresnel lens.

According to the light source device 100 of the first embodiment, two or more patterns of light distribution can be realized using one lens 20 and the light emitting device 10 located within the area of the one lens 20. Thus a size of the light source device 100 can be reduced, which makes it possible to suitably use such the light source device in a smartphone.

The combined body 10 and the lens 20, which are components of the light source device 100 of the above first embodiment, will be described below.

(Combined Body Including Light Emitting Portions 10)

As illustrated in FIG. 1A, the combined body 10 includes at least two light emitting portions (e.g., the first light emitting portion 10A and the second light emitting portion 10B) that are combined together with each other. As one of examples, the combined body 10 includes the first light emitting portion 10A and the second light emitting portion 10B, and also the second light emitting portion 10B is provided to surround at least a part of the first light emitting portion 10A in the plan view. Regarding the first and second light emitting portions 10A and 10B included in the combined body 10, as illustrated in FIG. 2A, the first light emitting portion 10A is provided in an area 50 inside the second light emitting portion 10B in the plan view. That is, the first light emitting portion 10A is located at a central area of the combined body 10. It is preferable that the first light emitting portion 10A and the second light emitting portion 10B are not in a direct contact with each other from a viewpoint of preventing a mutual light propagation.

In the light source device 100 of the first embodiment, each of the first and second light emitting portions 10A and 10B can emit a first light in substantially the same color therefrom. The first light emitting portion 10A and the second light emitting portion 10B are connected to respective wirings on a substrate 30. The substantially same color in the present embodiment means that a color difference (equivalent to a chromaticity difference) Δu'v' between the light emitted from the first light emitting portion and the light emitted from the second light emitting portion in a CIE 1976 (L*, u*, v*) color space is 0.05 or less.

(Forms of First Light Emitting Portion and Second Light Emitting Portion)

A planar shape of the first light emitting portion 10A can be square, rectangular, circular, oval, and/or polygonal. A planar shape of an outer part 10$B_1$ and an inner part 10$B_2$ of the second light emitting portion 10B surrounding the first light emitting portion 10A can also be square, rectangular, circular, oval, and/or polygonal in a plan view. The planar shape of the outer part 10$B_1$ and that of the inner part 10$B_2$ of the second light emitting portion 10B may be different from each other. Although not particularly limited, from a viewpoint of suitably securing an integration of the combined body 10, it is preferable that a planar contour of the first light emitting portion 10A is geometrically similar to a planar contour of each of the outer part 10$B_1$ and the inner part 10$B_2$ of the second light emitting portion 10B.

The first light emitting portion 10A includes the at least one first light emitting element 12A. By way of example, as illustrated in FIG. 1B, the first light emitting portion 10A can include at least one wavelength conversion member 11A disposed on a light emitting surface side of the at least one first light emitting element 12A, in addition to the first light emitting element 12A. The second light emitting portion 10B includes the second light emitting elements 12B. By way of example, as illustrated in FIG. 1B, the second light emitting portion 10B can include at least one wavelength conversion member 11B located on light emitting surface sides of the second light emitting elements 12B, in addition to the second light emitting elements 12B. A single wavelength conversion member 11A may be disposed on a light emitting surface side of each first light emitting element 12A, or a plurality of first light emitting elements 12A may share a common wavelength conversion member 11A. A single wavelength conversion member 11B may be disposed on a light emitting surface side of each second light emitting element 12B, or a plurality of second light emitting elements 12B may share a common wavelength conversion member 11B. The at least one wavelength conversion member 11B is preferably disposed to surround the outer periphery of the first light emitting portion 10A. On the light emitting surface sides of the plurality of second light emitting elements 12B, a single or first wavelength conversion member 11B may be disposed to surround the outer periphery of the first light emitting portion 10A.

Although not particularly limited, a proportion of the first light emitting portion 10A in the combined body 10 in the plan view can be 50 area % or more to 90 area % or less, or 60 area % or more to 80 area % or less, for example, 70 area %. A proportion of the second light emitting portion 10B in the combined body 10 in the plan view can be 10 area % or more to 50 area % or less, or 20 area % or more to 40 area % or less, for example, 30 area %. The proportion of the first light emitting portion 10A in the combined body 10 in the plan view means area % of the wavelength conversion member 11A in the plan view. A proportion of the second light emitting portion 10B in the combined body 10 in the plan view means area % of the wavelength conversion member 11B in the plan view.

In both the first embodiment and a second embodiment mentioned below, a second light emitting portion 10BI and a fourth light emitting portion 10BII, which are respective components of a first combined body including light emitting portions 10I and a second combined body including light emitting portions 10II, respectively, can be provided to surround at least parts of a first light emitting portion 10AI and a third light emitting portion 10AII, respectively. The first light emitting portion 10AI and the third light emitting portion 10AII, which are components of the first combined body 10I and the second combined body 10II, respectively, include, for example, a first light emitting element 12AI and a third light emitting element 12AII, and a wavelength conversion member 11AI and a wavelength conversion member 11AII provided on the respective light emitting surfaces of the first light emitting element 12AI and the third light emitting element 12AII, respectively. The second light emitting portion 10BI and the fourth light emitting portion 10BII, which are components of the first combined body 10I and the second combined body 10II, respectively, include, a second light emitting element 12BI and a fourth light emitting element 12BII, and a wavelength conversion member 11BI and a wavelength conversion member 11BII provided on the respective light emitting surfaces of the second light emitting element 12BI and the fourth light emitting element 12BII, respectively.

In this case, in both of the above first embodiment and the second embodiment mentioned below, the second light emitting portion can be classified in two major forms.

Figure 2B:
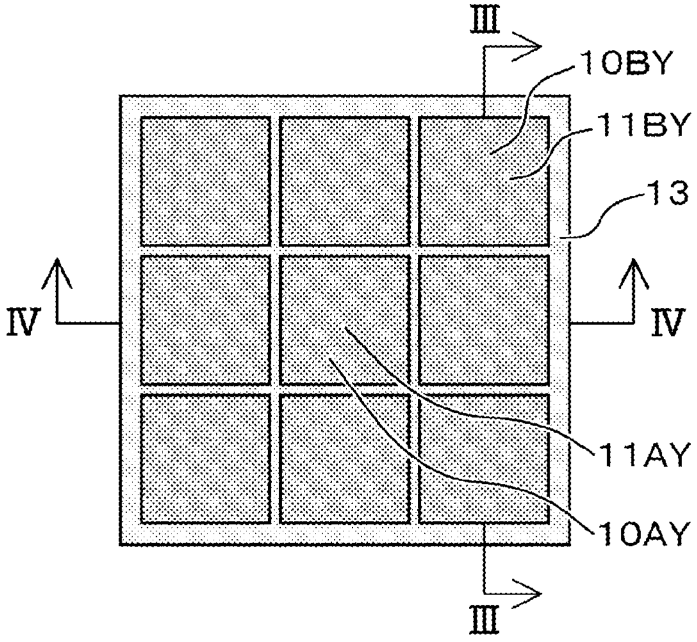
FIG. 2B is a plan view schematically illustrating an embodiment in which a second light emitting portion having at least two light emitting elements separated from each other surrounds a first light emitting portion.
Figure 2C:
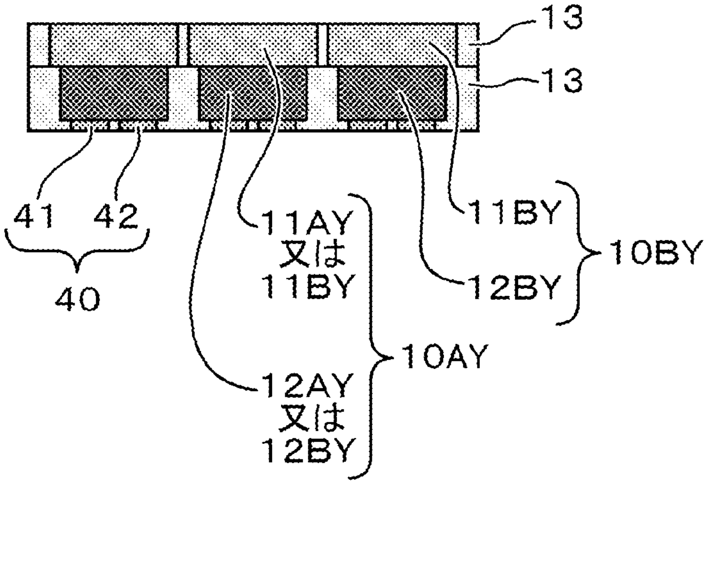
FIG. 2C is an end view schematically illustrating a cross-section of the second light emitting portion, taken along lines III-III and IV-IV in FIG. 2B.
Figure 2D:
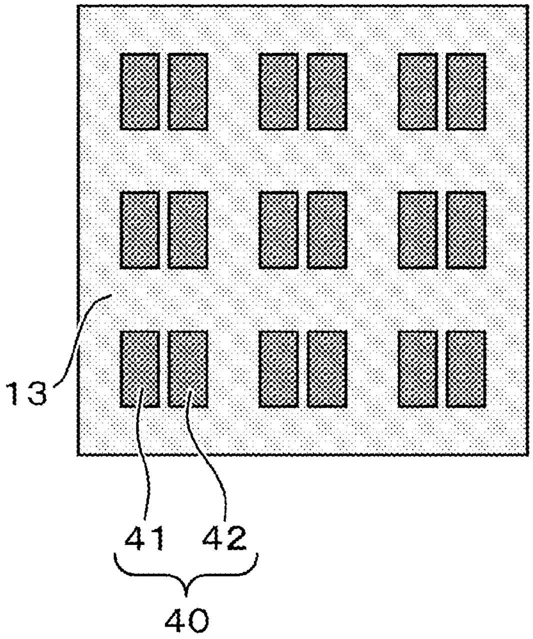
FIG. 2D is a schematic bottom view of a combined body including light emitting portions.

FIG. 2B is a plan view schematically illustrating an embodiment in which the second light emitting portion including at least two light emitting elements separated from each other surrounds the first light emitting portion. FIG. 2C is a cross-sectional view schematically illustrating the cross-section of the second light emitting portion, taken along lines III-III and IV-IV in FIG. 2B. FIG. 2D is a schematic bottom view of the combined body.

As illustrated in FIGS. 2B, 2C, and 2D, the second light emitting portion 10BY includes at least two second light emitting elements 12BY, and the at least two second light emitting elements 12BY are provided adjacent to each other so as to surround at least a part of a first light emitting portion 10AY in the plan view. That is, a second light emitting portion 10BY that surrounds the first light emitting portion 10AY including a first light emitting element 12AY includes at least two second light emitting elements 12BY that are separated from each other. The first light emitting element 12AY and the plurality of second light emitting elements 12BY are arrayed longitudinally and laterally (in other words, disposed in a matrix in first and second directions that are perpendicular to each other) to form a grid.

In this case, the at least two second light emitting elements 12BY disposed separately from each other are controlled to be lit independently, thereby allowing light to be emitted from the second light emitting portion 10BY side. In the second light emitting portion 10BY surrounding the first light emitting portion 10AY, a reflective member 13 is preferably disposed on a lateral surface of each of the light emitting elements disposed separately. Further, the reflective member 13 is preferably disposed between the lateral surface of a wavelength conversion member 11BY located on one of the adjacent second light emitting elements 12BY and the lateral surface of the wavelength conversion member 11BY located on the other second light emitting element 12BY. That is, the reflective member 13 is preferably disposed between the adjacent wavelength conversion members 11BY. This can prevent uneven color and brightness caused by light emitted from the adjacent first and second light emitting elements 12AY and 12BY.

In the embodiments illustrated in FIGS. 2B to 2D, because the adjacent second light emitting elements 12BY of the second light emitting portion 10BY are separated from each other, the second light emitting elements 12BY can be individually connected to the wiring of the substrate connected under the second light emitting portion 10BY. Thus, at least two second light emitting elements 12BY are controllable to be lit independently and collectively at the same time. Alternatively, at least two second light emitting elements 12BY are controllable to be lit independently and individually at different times.

Furthermore, in FIGS. 2B and 2C, all the first light emitting element 12AY, a wavelength conversion member 11AY, the second light emitting element 12BY, and the wavelength conversion member 11BY are disposed at equal intervals, but are not limited thereto. That is, the distance between adjacent light emitting elements or adjacent wavelength conversion members may vary. Also, in FIGS. 2B to 2D, one first light emitting element 12AY is disposed as the first light emitting portion 10AY, but is not limited thereto. That is, the first light emitting portion 10AY may include two or more first light emitting elements 12AY. In this case, the two or more light emitting elements AY are preferably disposed in a matrix.

Figure 2E:
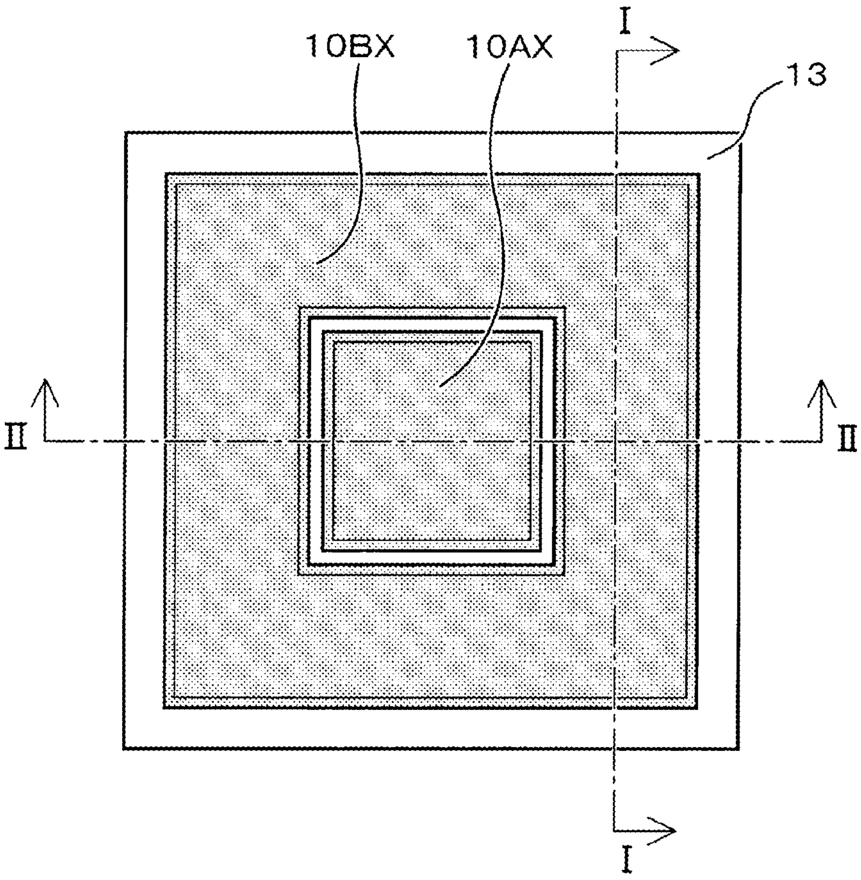
FIG. 2E is a plan view schematically illustrating a second light emitting portion that has one light emitting element disposed separately from and along an outer periphery of the first light emitting portion.
Figure 2F:
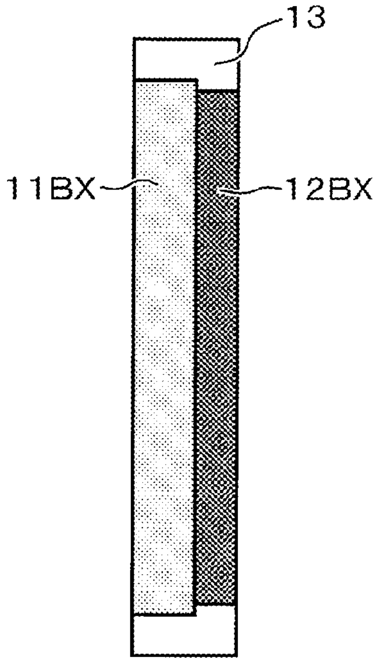
FIG. 2F is an end view schematically illustrating a cross-section of the second light emitting portion, taken along line I-I in FIG. 2E.
Figure 2G:
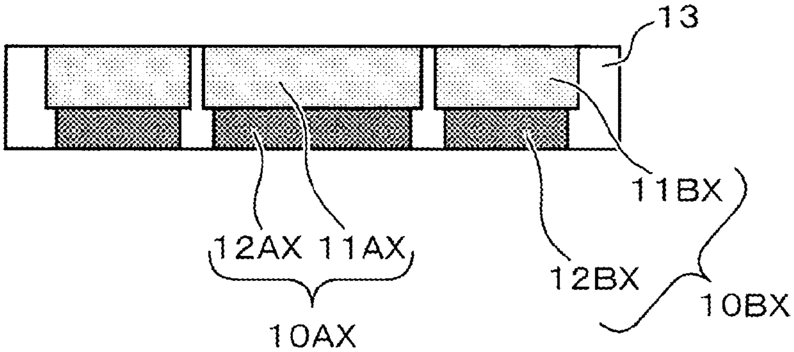
FIG. 2G is an end view schematically illustrating a cross-section of the combined body taken along line II-II in FIG. 2E.

FIG. 2E is a plan view schematically illustrating the second light emitting portion that has one light emitting element disposed separately from and along the outer periphery of the first light emitting portion. FIG. 2F is an end view schematically illustrating the cross-section of the second light emitting portion, taken along line I-I in FIG. 2E. FIG. 2G is an end view schematically illustrating the cross-section of the combined body, taken along line II-II in FIG. 2E.

As illustrated in FIGS. 2E, 2F, and 2G, the second light emitting portion 10BX includes a second light emitting element 12BX (i.e., single or one second light emitting element 12BX). The second light emitting portion 10BX is disposed separately from and along the outer periphery of the first light emitting portion and includes one second light emitting element, in the plan view.

In this case, the second light emitting portion 10BX including one second light emitting element 12BX is controlled to be lit independently, thereby allowing the light to be emitted from the second light emitting portion 10BX.

Second light emitting elements of the second light emitting portion 10BX are formed to continuously surround the outer periphery of a first light emitting portion 10AX as illustrated in FIGS. 2E, 2F and 2G, which can secure a wide area where the light emitting surface of the second light emitting element 12BX and a wavelength conversion member 11BX are in direct contact with each other. Thus, the light from the second light emitting element 12BX can be guided directly into the wavelength conversion member 11BX, enabling more effective wavelength conversion of the light. In addition, the connection between the second light emitting portion 10BX and the wiring of the substrate connected under the second light emitting portion 10BX can be simplified.

The first light emitting element 12A of the first light emitting portion 10A and the second light emitting element 12B of the second light emitting portion may have any shape in the plan view. The first light emitting element 12A of the first light emitting portion 10A and the second light emitting element 12B of the second light emitting portion 10B can be, for example, square, rectangular, and/or polygonal in the plan view. When the first light emitting element 12A is rectangular in the plan view, the first light emitting element 12A of the first light emitting portion 10A may have a dimension in the longitudinal and lateral directions of, for example, 200 μm or more to 2 mm or less, preferably 500 μm or more to 1.5 mm or less, and more preferably 800 μm or more to 1 mm or less in the plan view. Further, as mentioned later, when the second light emitting element 12B of the second light emitting portion 10B is rectangular in the plan view and includes one second light emitting element 12BX, the outer contour of the second light emitting element 12B may have a dimension in the longitudinal and lateral directions of, for example, 500 μm or more to 3 mm or less, preferably 1 mm or more to 2.5 mm or less, and more preferably 1.5 mm or more to 2.0 mm or less in the plan view. When the second light emitting element 12B of the second light emitting portion 10B includes one second light emitting element 12BX, the inner contour of the second light emitting element 12BX may have a dimension in the longitudinal and lateral directions of, for example, 200 μm or more to 2 mm or less, preferably 500 μm or more to 1.5 mm or less, and more preferably 800 μm or more to 1 mm or less in the plan view.

Furthermore, when the second light emitting portion 10B includes a plurality of second light emitting elements 12B having a rectangular shape and disposed separately from each other, each of the plurality of the second light emitting elements 12B can have a dimension in the longitudinal and lateral directions of, for example, 100 μm or more to 2 mm or less, and preferably 200 μm or more to 1.5 mm or less in the plan view. The height (from the light emitting surface to an electrode surface) of each of the first light emitting element 12A of the first light emitting portion 10A and the second light emitting element 12B (or second light emitting element 12BX) of the second light emitting portion can be 10 μm or more to 300 μm or less, and preferably 150 μm or more to 300 μm or less.

The substrate 30 is a wiring substrate provided with positive and negative wirings on its top surface. For example, input and output terminals are provided for each wiring corresponding to the first light emitting element 12A and the second light emitting element 12B, so that the respective light emitting elements can be controllable to be lit independently as mentioned above, and therefore each light emitting portion can also be controlled to be lit independently. Main material of the substrate 30 is an insulating material and is preferably one that is difficult for light from the light emitting element to pass therethrough. For example, the substrate 30 may contain a ceramic material and a resin material.

Each of the above light emitting elements (the first light emitting element 12A, the second light emitting element 12B, the third light emitting element 12AII, and the fourth light emitting element 12BII) includes a semiconductor laminate and at least one pair of electrodes 40 (positive electrode 41 and negative electrode 42) having different polarities. The light emitting element includes the light emitting surface (also called the main light emitting surface), a lateral surface extending in a different direction (e.g., perpendicular) to the light emitting surface, and an electrode surface that is a surface opposite to the light emitting surface and provided with at least one pair of positive and negative electrodes. As a light emitting element, a semiconductor light emitting element capable of emitting light with any wavelength can be selected. For example, a light emitting diode or the like can be selected as the light emitting element. By way of example, as the light emitting element, one that emits blue light can be used. The light emitting element is not limited thereto and may be one that emits any color light other than blue light.

For example, a nitride-based semiconductor ($In_xAl_yGa_{1-x-y}N$, $0 \leq X$, $0 \leq Y$, $X+Y \leq 1$) can be used as the semiconductor laminate of a light emitting element capable of emitting blue light. In this case, the nitride-based semiconductor light emitting element has, for example, a sapphire substrate and a nitride-based semiconductor laminated structure laminated on the sapphire substrate. The nitride-based semiconductor laminated structure includes a light emitting layer, and an n-type nitride-based semiconductor layer and a p-type nitride-based semiconductor layer that are arranged to sandwich the light emitting layer therebetween. Electrodes, namely, an n-side electrode and a p-side electrode, are electrically connected to the n-type nitride-based semiconductor layer and the p-type nitride-based semiconductor layer, respectively.

The wavelength conversion members (the wavelength conversion member 11A and the wavelength conversion member 11B) are provided on the light emitting surface side of the light emitting element and are capable of absorbing light emitted from the light emitting element and converting it into light with a different wavelength. The wavelength conversion member includes a phosphor or the like in a base material such as resin and glass. Examples of the phosphor suitable for use include yttrium aluminum garnet based phosphors (for example, $Y_3(Al,Ga)_5O_{12}:Ce$), lutetium aluminum garnet based phosphors (for example, $Lu_3(Al,Ga)_5O_{12}:Ce$), terbium aluminum garnet based phosphors (for example, $Tb_3(Al,Ga)_5O_{12}:Ce$), nitride-based phosphors such as a β-sialon based phosphor (for example, $(Si,Al)_3(O,N)_4:Eu$), an α-sialon based phosphors (for example, $Ca(Si,Al)_{12}(O,N)_{16}:Eu$), a CASN-based phosphor (for example, $CaAlSiN_3:Eu$), and a SCASN-based phosphor (for example, $(Sr,Ca)AlSiN_3:Eu$), fluoride-based phosphors such as a KSF-based phosphor (for example, $K_2SiF_6:Mn$), a KSAF-based phosphor (for example, $K_2(Si,Al)F_6:Mn$), and a MGF-based phosphor (for example, $3.5MgO \cdot 0.5MgF_2 \cdot GeO_2:Mn$), phosphors having a perovskite structure (for example, $CsPb(F,Cl,Br,I)_3$), quantum dot phosphors (for example, CdSe, InP, $AgInS_2$, $AgInSe_2$, $AgInGaS_2$ or $CuAgInS_2$) and the like. The phosphors mentioned above may be used alone or in combination.

In addition, each of the first and second light emitting portions 10A and 10B can be further provided with the reflective member 13 that cover the lateral surfaces of the light emitting element and the lateral surfaces of the wavelength conversion members 11A and 11B, except for upper surfaces of the wavelength conversion members 11A and 11B. The reflective member 13 is a member that makes it easier to guide the light emitted from the light emitting element toward a predetermined direction.

The reflective member 13 may be made of, for example, a base resin and a light reflective substance contained in the base resin. As the base resin, a resin such as a silicone resin, a modified silicone resin, an epoxy resin, a modified epoxy resin, an acrylic resin, or a hybrid resin containing at least one or more of these resins can be used.

As the light reflective substance, at least one compound selected from titanium oxide, silicon oxide, zirconium oxide, magnesium oxide, yttrium oxide, yttria-stabilized zirconia, calcium carbonate, calcium hydroxide, calcium silicate, niobium oxide, zinc oxide, barium titanate, potassium titanate, magnesium fluoride, alumina, aluminum nitride, boron nitride, and mullite can be used.

From the viewpoint of suitably reflecting the light emitted from the light emitting element, the reflective member 13 may be made of a white resin having a reflectance of, for example, 60% or more to this light, and preferably a white resin having a reflectance of 90% or more.

A light-transmissive member can also be provided between the lateral surface of the light emitting element and the reflective member 13 and/or on the light emitting surface of the light emitting element. Examples of the material of the light-transmissive member include silicone resin, epoxy resin, and acrylic resin.

(Lens 20)

The lens 20 is disposed above the combined body 10 to span the first light emitting portion 10A and the second light emitting portion 10B. Consequently, the lens 20 allows the light emitted from each light emitting portion to enter the lens 20 and then allows the incident light to exit therefrom in a predetermined direction. Specifically, one lens 20 disposed above one combined body 10 has an incident surface 20*a* into which lights emitted from the combined body 10 (i.e., the light emitted from the first light emitting portion 10A and the light emitted from the second light emitting portion 10B) enter and an exit surface 20*b* from which the lights exit. As the lens 20, a Fresnel lens can be used, for example. The lens 20 has a plurality of concentric annular convex portions on an incident surface (corresponding to the lower surface) 20*a* of the lens 20 (see FIG. 1B, FIGS. 3A to 3C, FIGS. 4A to 4F, and the like). The lens 20 has, on its lower surface 20*a*, a first convex portion 21, a second convex portion 22, a third convex portion 23, a fourth convex portion 24, a fifth convex portion 25, and a sixth convex portion 26 in this order from the center of the lens 20. The exit surface 20*b* of the lens 20, which corresponds to an upper surface has a flat shape.

Figure 4A:
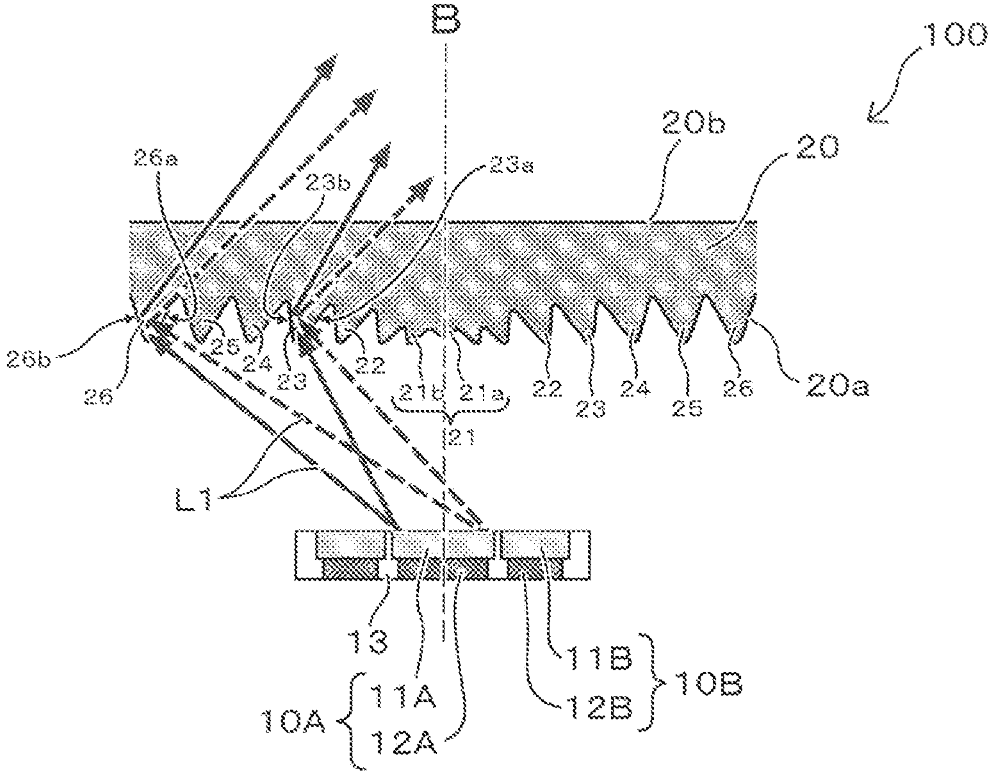
FIG. 4A is an end view schematically illustrating an embodiment on a light distribution control of light emitted from the first light emitting portion by the Fresnel lens.
Figure 4B:
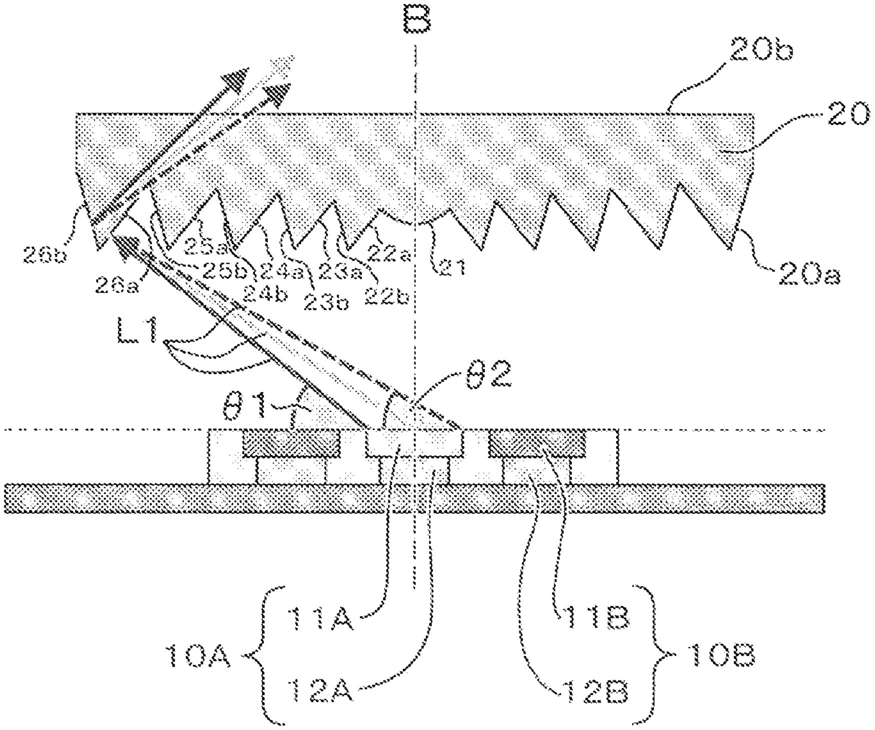
FIG. 4B is an end view schematically illustrating an embodiment on a light distribution control (ultra-wide angle light distribution control) of light emitted from the first light emitting portion by the Fresnel lens.
Figure 4C:
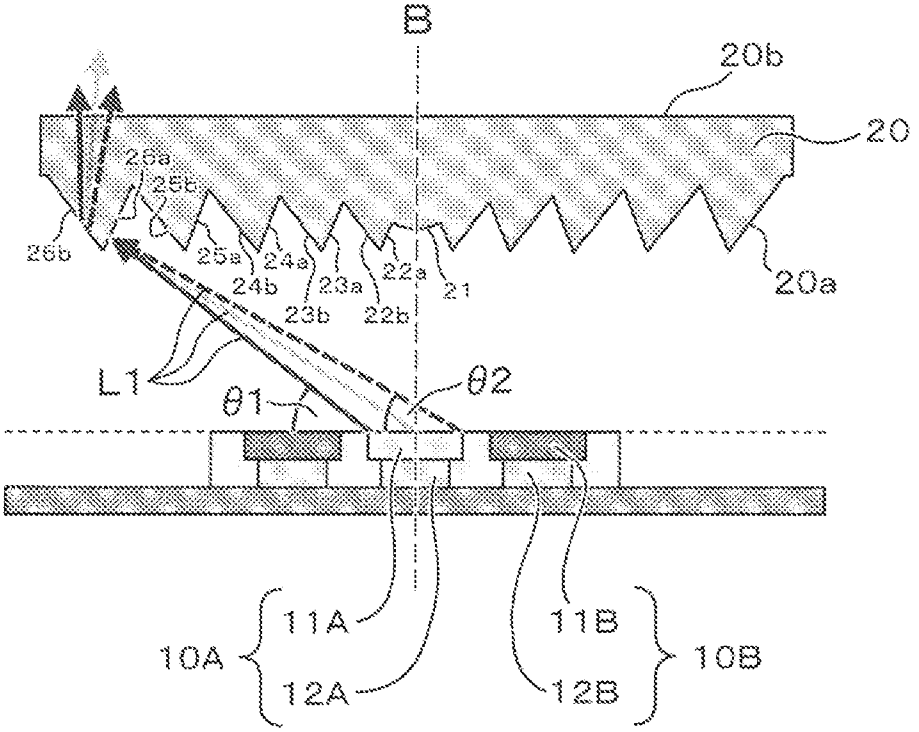
FIG. 4C is an end view schematically illustrating an embodiment on a light distribution control (ultra-narrow angle light distribution control) of light emitted from the first light emitting portion by the Fresnel lens.
Figure 4D:
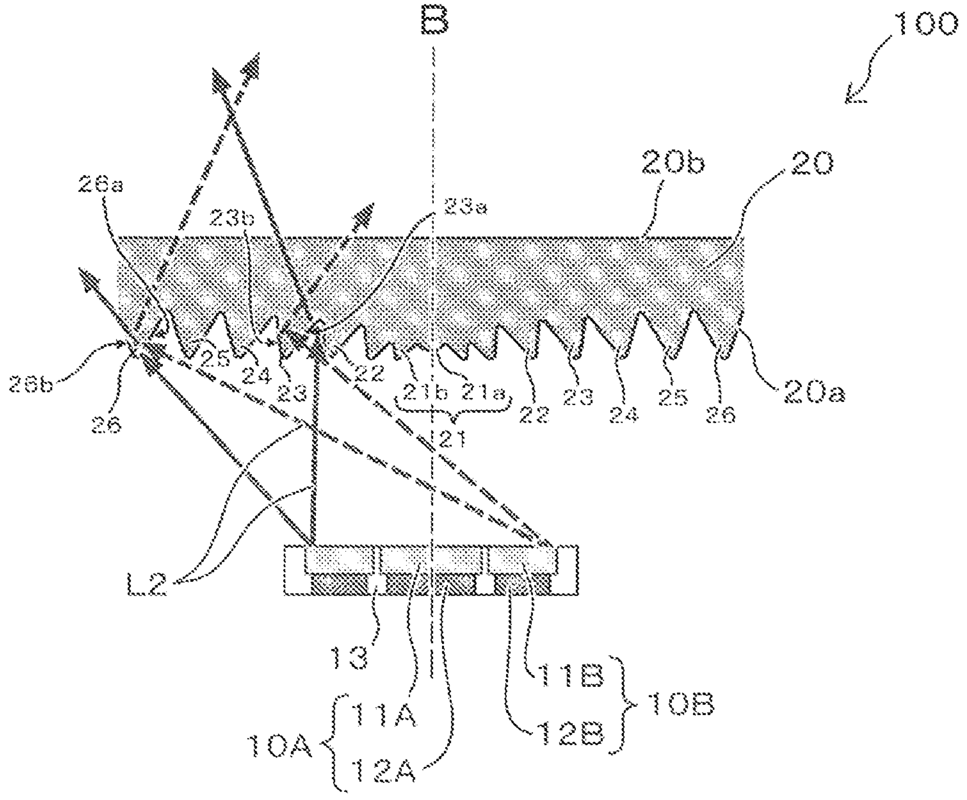
FIG. 4D is an end view schematically illustrating an embodiment on a light distribution control of light emitted from the second light emitting portion by the Fresnel lens.

The first convex portion 21 located at the center may be constituted of a convex curved surface 21*a* as illustrated in FIG. 1B, but from the viewpoint of light distribution properties, it may also have a plurality of fine convex members 21*b* that are arranged concentrically about the convex curved surface 21*a* as the center (see FIGS. 4A and 4D). Each fine convex member 21*b* has an incident surface and a reflective surface.

In FIG. 1B, the area size of the convex curved surface of the first convex portion 21 at the center is made larger than the area size of each of other convex portions in the end view. However, the area size of the convex curved surface of the first convex portion 21 at the center is not limited thereto and can be substantially the same as the area size of each of the other convex portions in consideration of a desired range irradiated with the light emitted from an exit surface (corresponding to the upper surface) 20*b* of the lens.

The second convex portion 22, the third convex portion 23, the fourth convex portion 24, the fifth convex portion 25 and the sixth convex portion 26 are respective annular convex portions in the plan view. The second convex portion 22 has an incident surface 22*a* and a reflective surface 22*b*, the third convex portion 23 has an incident surface 23*a* and a reflective surface 23*b*, the fourth convex portion 24 has an incident surface 24*a* and a reflective surface 24*b*, the fifth convex portion 25 has an incident surface 25*a* and a reflective surface 25*b*, and the sixth convex portion 26 has an incident surface 26*a* and a reflective surface 26*b* (see FIG. 1B).

The first light emitting portion 10A overlaps the first convex portion 21 of the lens 20 in the plan view and is disposed such that the concentric center of the Fresnel lens of the lens 20 (in other words, the optical axis B) substantially coincides with the center of the first light emitting portion 10A. The second light emitting portion 10B is disposed, for example, directly under the third convex portion 23 and the fourth convex portion 24 and inside and under the fifth convex portion 25 and the sixth convex portion 26 in the end view.

The following describes a path where the light emitted from the light emitting surface of each light emitting portion passes through the lens 20 having each convex portion with the above configuration (see FIG. 3A, FIG. 3B, FIG. 3C, and FIGS. 4A to 4F). For explanation, in the present embodiment, a path through which a part of the light emitted from each light emitting portion passes may be illustrated with an arrow as a light ray. In detail, an angle formed by the light ray (or light) and an optical axis of the lens means an angle formed by a light ray of a part of the light emitted from each light emitting portion and the optical axis of the lens. The light ray and the optical axis of the lens may have an intersection on their extended lines, or they may be located at skew lines. In the present embodiment, the angle between the light ray and the optical axis of the lens means an angle formed by the light ray and the optical axis of the lens when the light ray is moved parallel to the optical axis of the lens to have an intersection.

(In a State in Which No Light Emitting Portions are Lit)

As mentioned above, the light source device 100 of the first embodiment is capable of controlling the respective light emitting elements so that they are lit independently. The state in which no light emitting elements are lit is illustrated in FIG. 3A.

(In a State in Which the First Light Emitting Portion 10A is Lit)

Next, the state in which the first light emitting portion 10A is controlled to be lit is exemplified (see FIGS. 3B and 4A). In this state, the path where light L1 emitted from the light emitting surface of the first light emitting portion 10A passes can be roughly classified into the following three cases.

First Case

A case in which the light emitted from the light emitting surface of the first light emitting portion 10A exits via the first convex portion 21

Second Case

A case in which the light emitted from the light emitting surface of the first light emitting portion 10A exits via a convex portion located closer to the first convex portion 21 (for example, the second convex portion 22, the third convex portion 23, and the fourth convex portion 24)

Third Case

A case in which the light emitted from the light emitting surface of the first light emitting portion 10A exits via a convex portion located farther from the first convex portion 21 (for example, the fifth convex portion 25 and the sixth convex portion 26)

In the first case, the light emitted from the first light emitting portion 10A is incident from the incident surface of the first convex portion 21 (i.e., convex curved surface 21*a*) and travels along the optical axis B of the lens 20. In the second case, as illustrated in FIG. 4A, the light emitted from the first light emitting portion 10A is incident from, for example, the respective incident surfaces of the second convex portion 22, the third convex portion 23, and the fourth convex portion 24 (i.e., the incident surfaces 22*a*, 23*a*, and 24*a*), and then is reflected by the respective reflective surfaces (i.e., the reflective surfaces 22*b*, 23*b*, and 24*b*). In the third case, as illustrated in FIG. 4A, the light emitted from the first light emitting portion 10A is incident from, for example, the incident surface 25*a* of the fifth convex portion and the incident surface 26*a* of the sixth convex portion 26, and then is reflected by the reflective surface 25*b* of the fifth convex portion 25 and the reflective surface 26*b* of the sixth convex portion 26.

(In a State in Which the Second Light Emitting Portion 10B is Lit)

Next, the state in which the second light emitting portion 10B is controlled to be lit will be specifically described by way of example (see FIGS. 3C and 4D). In this state, a path in which light L2 emitted from the light emitting surface of the second light emitting portion 10B passes can be roughly classified into a fourth case and a fifth case as mentioned below. There may be a case in which the light emitted from the light emitting surface of the second light emitting portion 10B may exit via the first convex portion 21, depending on a positional relationship between the second light emitting portion 10B and the first convex portion 21.

Fourth Case

A case in which the light emitted from the light emitting surface of the second light emitting portion 10B exits via a convex portion located closer to the first convex portion 21 (for example, the second convex portion 22, the third convex portion 23, and the fourth convex portion 24)

Fifth Case

A case in which the light emitted from the light emitting surface of the second light emitting portion 10B exits via a convex portion located farther from the first convex portion 21 (for example, the fifth convex portion 25 and the sixth convex portion 26)

In the fourth case, the light emitted from the second light emitting portion 10B may be incident from, for example, the respective incident surfaces of the second convex portion 22, the third convex portion 23, and the fourth convex portion 24 (i.e., the incident surfaces 22*a*, 23*a*, and 24*a*), and then the incident light may be reflected by the respective reflective surfaces (i.e., the reflective surfaces 22*b*, 23*b*, and 24*b*). Alternatively, the incident light from the second light emitting portion 10B may be refracted in a direction away from the optical axis B without being reflected by the respective reflective surfaces (i.e., the reflective surfaces 22*b*, 23*b*, and 24*b*) and may then exit from the exit surface 20*b* of the lens 20. Similarly, in the fifth case, the light emitted from the second light emitting portion 10B may be incident from, for example, the respective incident surfaces of the fifth convex portion 25 and the sixth convex portion 26 (i.e., the incident surfaces 25*a* and 26*a*), and then the incident light may be reflected by the respective reflective surfaces (i.e., the reflective surfaces 25*b* and 26*b*). Alternatively, the light incident from the second light emitting portion 10B may be refracted in a direction away from the optical axis B without being reflected by the respective reflective surfaces (i.e., the reflective surfaces 25*b* and 26*b*) and may then exit from the exit surface 20*b* of the lens 20.

The above third case will be specifically described below by way of example with references to FIGS. 4B and 4C. The matter described below is not limited to the third case and can also be applied to the second case.

(Ultra-Wide Angle Light Distribution Control)

In the third case, as illustrated in FIG. 4B by way of example, the light emitted from the first light emitting portion 10A is incident from, for example, the incident surface 25*a* of the fifth convex portion 25 and the incident surfaces 26*a* of the sixth convex portion 26, and then reflected by the reflective surface 25*b* of the fifth convex portion 25 and the reflective surface 26*b* of the sixth convex portion 26 so as to form a large angle with respect to the optical axis B. Similarly, in the second case, the light emitted from the first light emitting portion 10A is incident from, for example, the respective incident surfaces of the second convex portion 22, the third convex portion 23, and the fourth convex portion 24 (i.e., the incident surfaces 22*a*, 23*a*, and 24*a*), and then reflected by the respective reflective surfaces (i.e., the reflective surfaces 22*b*, 23*b*, and 24*b*) so as to form a large angle with respect to the optical axis B.

As can be seen here from FIG. 4B, an angle at which the light emitted from the first light emitting portion 10A is directed toward the respective convex portions (for example, the second convex portion 22 to the sixth convex portion 26) is substantially constant even if the light is emitted from any area of the light emitting surface of the first light emitting portion 10A. As one of examples, in the end view, an angle θ1 at which the light from one end of the first light emitting portion 10A is directed to any point (in other words, position) on the sixth convex portion 26 is substantially identical to an angle θ2 at which the light from the other end of the first light emitting portion 10A is directed to any point on the sixth convex portion 26. In addition, an angle at which the light from a central area of the first light emitting portion 10A (in other words, an area other than the one end and the other end of the first light emitting portion 10A) is directed to any point of the sixth convex portion 26 is also substantially identical to each of the angles θ1 and θ2. It is noted that each of the angle θ 1 and θ2 means an angle formed between the light emitting surface of the first light emitting portion 10A and the light ray of light emitted from the first light emitting portion 10A.

Thus, even if the light is emitted from any area of the light emitting surface of the first light emitting portion 10A, the angle formed by the light reflected on the reflective surface 26*b* of the sixth convex portion 26 and the optical axis B of the lens 20 can be controlled to approach a desired angle. From the same perspective, the light emitted from the first light emitting portion 10A becomes easier to control in order from the second convex portion 22 to the fifth convex portion 25 so that the angle formed by the light reflected on the reflective surface of each convex portion and the optical axis B of the lens 20 gets close to the desired angle. That is, any light emitted from the light emitting surface of the first light emitting portion 10A can be approximated as the path of light L1, so that many light rays can be controlled as intended. When the intended light distribution is ultra-wide angle light distribution, it approaches the ultra-wide angle light distribution.

This desired angle, corresponding to an angle formed between the light reflected on the reflection surface of each convex portion and the optical axis B of the lens 20 to become larger, can be adjusted by changing a shape, a size, a position of each convex portion of the lens 20, and/or the like. For example, the light distribution of the light emitted from the lens 20 can be controlled to be the ultra-wide angle light distribution by setting an angle between the optical axis B of the lens 20 and each of the reflective surfaces (22*b*, 23*b*, 24*b*, 25*b*, and 26*b*) of the convex portions to be relatively small.

In this way, a range irradiated with light from the lens 20 referred to as irradiation distribution can be enlarged by changing (i.e., controlling) the light distribution of the light emitted from the first light emitting portion 10A via each convex portion of the lens 20, for example, the second convex portion 22 to the sixth convex portion 26. Thus, the light from the first light emitting portion 10A can show the ultra-wide angle light distribution.

Figure 4E:
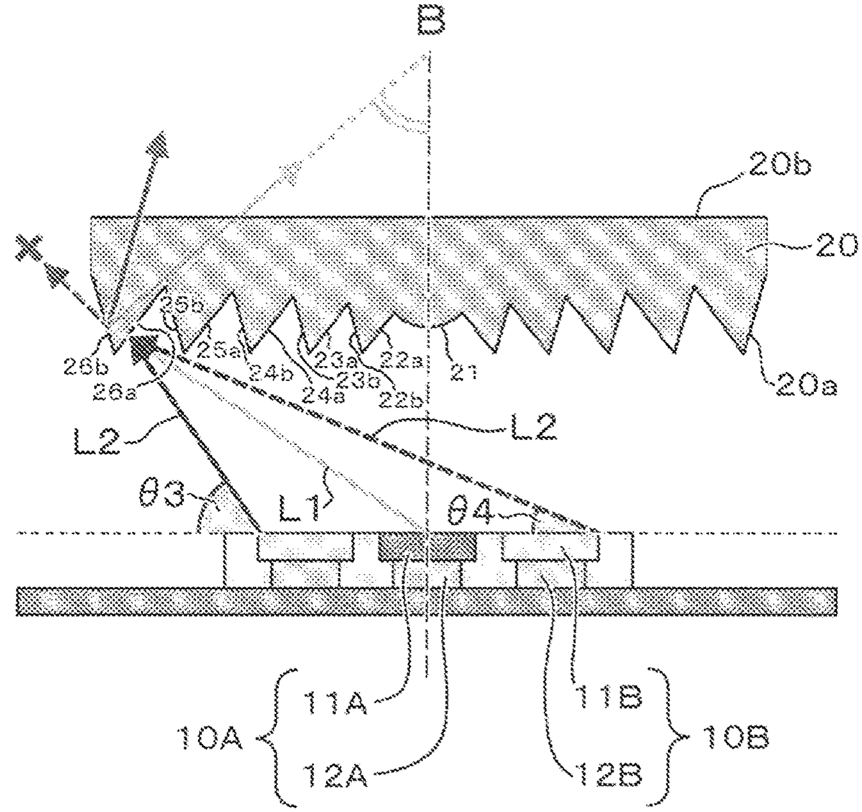
FIG. 4E is an end view schematically illustrating an embodiment on a light distribution control (wide angle light distribution control) of light emitted from the second light emitting portion by the Fresnel lens.
Figure 4F:
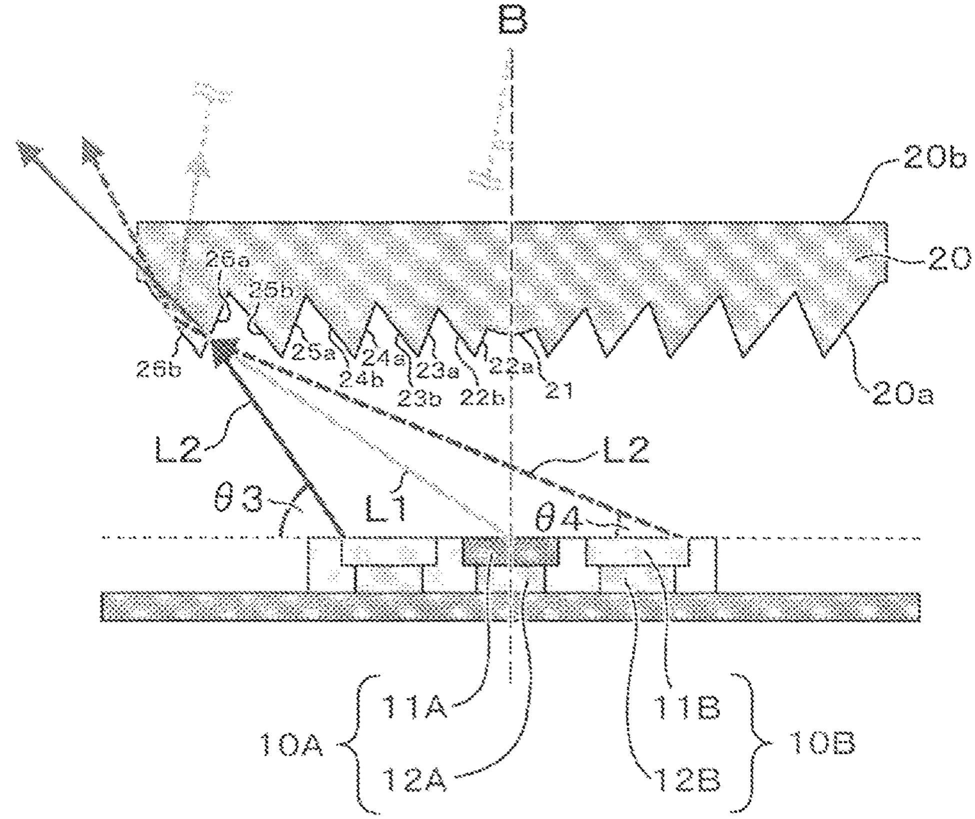
FIG. 4F is an end view schematically illustrating an embodiment on a light distribution control (narrow angle light distribution control) of light emitted from the second light emitting portion by the Fresnel lens.

Next, the above fifth case will be specifically described by way of example with references to FIGS. 4E and 4F. The matter described below is not limited to the fifth case and can also be applied to the fourth case.

Wide Angle Light Distribution Control

In the fifth case, as illustrated in FIG. 4E by way of example, the light emitted from the second light emitting portion 10B may be incident from, for example, the respective incident surfaces of the fifth convex portion 25 and the sixth convex portion 26 (i.e., the incident surfaces 25*a* and 26*a*), and then the incident light may be reflected by the respective reflective surfaces (i.e., the reflective surfaces 25*b* and 26*b*) to form a small angle with respect to the optical axis B. Alternatively, the light incident from the second light emitting portion 10B may be refracted in a direction away from the optical axis B without being reflected by the respective reflective surfaces (i.e., the reflective surface 25*b* and the reflective surface 26*b*) and may then exit from the exit surface 20*b* of the lens 20. Similarly, in the fourth case, the light emitted from the second light emitting portion 10B is incident from, for example, the respective incident surfaces of the second convex portion 22, the third convex portion 23, and the fourth convex portion 24 (i.e., the incident surfaces 22*a*, 23*a*, and 24*a*), and then the incident light is reflected by the respective reflective surfaces (i.e., the reflective surfaces 22*b*, 23*b*, and 24*b*) to form a small angle with respect to the optical axis B. Alternatively, the light incident from the second light emitting portion 10B may be refracted in a direction away from the optical axis B without being reflected by the respective reflective surfaces (i.e., the reflective surfaces 22*b*, 23*b*, and 24*b*) and may then exit from the exit surface 20*b* of the lens 20.

As can be seen here from FIG. 4E, an angle at which the light emitted from the second light emitting portion 10B is directed toward any point on the respective convex portions (for example, the second convex portion 22 to the sixth convex portion 26) varies depending on a position of the second light emitting portion 10B with respect to the corresponding convex portion. In the end view, an angle θ3 at which the light from the second light emitting portion 10B located on one side of the first light emitting portion 10A and close to any point on the sixth convex portion 26 is directed to any point on the sixth convex portion 26 is different from an angle θ4 at which the light from the second light emitting portion 10B located on the other side of the first light emitting portion 10A and farther from any point on the sixth convex portion 26 is directed to any point on the sixth convex portion 26. In detail, a difference between the angle θ3 and the angle θ4 is greater than a difference between the angle θ1 and the angle θ2. Each of the angles θ3 and θ4 means an angle formed between the light emitting surface of the second light emitting portion 10B and the light ray of the light emitted from the second light emitting portion 10B.

Because the angle of the light ray of the light directed toward any point on the sixth convex portion 26 varies depending on the position of the second light emitting portion 10B relative to any point on the sixth convex portion 26, This may cause variations in the angle between the light reflected on the reflective surface 26*b* of the sixth convex portion 26 and the optical axis B of the lens 20. From the same perspective, when the light emitted from the second light emitting portion 10B is directed, for example, from the second convex portion 22 to the fifth convex portion 25, this may cause variations in the angle formed between the light reflected on each reflective surface of the corresponding convex portion and the optical axis B of the lens 20. As a result, a proportion of the light that is emitted from the second light emitting portion 10B and is controllable via the respective convex portions of the lens 20, for example, the second convex portion 22 to the sixth convex portion 26, is less than the proportion of the light that is emitted from the first light emitting portion 10A and is controllable via them. This means that a controllable light as intended becomes smaller because the path of the light L2 emitted from the light emitting surface of the second light emitting portion 10B is farther from the path of the light L1 emitted from the first light emitting portion 10A. When the intended light distribution is ultra-wide angle light distribution, it is difficult to control the light distribution to the ultra-wide angle light distribution. Thus, the light distribution approaches the Lambertian light distribution, resulting in wide angle light distribution. Therefore, the second light emitting portion 10B can be used for the wide angle light distribution control.

The angle formed between the light reflected on the reflection surface of each convex portion and the optical axis B can be adjusted to be made larger by changing the shape, size, position and/or the like of each convex portion of the lens 20. For example, the wide angle light distribution can be controlled by setting the angle formed between the optical axis B of the lens 20 and the reflective surface of each convex portion to be relatively small (for example, 10 degrees or more to 30 degrees or less).

Ultra-Narrow Angle Light Distribution Control

In the third case, as illustrated in FIG. 4C by way of example, the light emitted from the first light emitting portion 10A is incident from, for example, the incident surface 25*a* of the fifth convex portion 25 and the incident surface 26*a* of the sixth convex portion 26, and then reflected by the reflective surface 25*b* of the fifth convex portion 25 and the reflective surface 26*b* of the sixth convex portion 26 so as to form a small angle with respect to the optical axis B of the lens 20. Similarly, in the second case, the light emitted from the first light emitting portion 10A is incident from, for example, the respective incident surfaces of the second convex portion 22, the third convex portion 23, and the fourth convex portion 24 (i.e., the incident surfaces 22*a*, 23*a*, and 24*a*), and then reflected by the respective reflective surfaces (i.e., the reflective surfaces 22*b*, 23*b*, and 24*b*) so as to form a small angle with respect to the optical axis B of the lens 20.

As can be seen from FIG. 4C, an angle at which the light emitted from the first light emitting portion 10A is directed toward the respective convex portions (for example, the second convex portion 22 to the sixth convex portion 26) is substantially constant even if the light is emitted from any area of the light emitting surface of the first light emitting portion 10A. In the end view, for example, an angle θ1 at which the light from one end of the first light emitting portion 10A is directed to the sixth convex portion 26 is substantially identical to an angle θ2 at which the light from the other end of the first light emitting portion 10A is directed to the sixth convex portion 26. In addition, an angle at which the light from the central area of the first light emitting portion 10A (in other words, an area other than one end and the other end of the first light emitting portion 10A) is directed to the sixth convex portion 26 is also substantially identical to each of the angles θ1 and θ2.

Thus, even if the light is emitted from any area of the light emitting surface of the first light emitting portion 10A, the angle formed between the light reflected on the reflective surface 26*b* of the sixth convex portion 26 and the optical axis B of the lens 20 can be controlled to approach a desired angle. From the same perspective, the light emitted from the first light emitting portion 10A can be controlled so that the angle formed between the light reflected on the reflective surface of each convex portion and the optical axis B of the lens 20 gets close to the desired angle even when the light is directed from the second convex portion 22 to the fifth convex portion 25. Thus, any light emitted from the light emitting surface of the first light emitting portion 10A can be approximated as the path of light L1, and thus many lights can be controlled as intended. When the intended light distribution is ultra-wide angle light distribution, it approaches the ultra-wide angle light distribution.

This desired angle, corresponding to an angle formed between the optical axis of the light reflected on the reflection surface of each convex portion and the optical axis B of the lens 20 to become smaller, can be adjusted by changing the shape, size, position and/or the like of each convex portion of the lens 20.

In this way, the light distribution of the light emitted from the first light emitting portion 10A is changed (i.e., controlled) via each convex portion of the lens 20, for example, the second convex portion 22 to the sixth convex portion 26, and thus a range irradiated with the light from the lens 20 (also referred to as the irradiation distribution) can be made narrower. Thus, the light from the first light emitting portion 10A can show the ultra-narrow angle light distribution.

Narrow Angle Light Distribution Control

In the fifth case, as illustrated in FIG. 4F by way of example, the light emitted from the second light emitting portion 10B may be incident from, for example, the respective incident surfaces of the fifth convex portion 25 and the sixth convex portion 26 (i.e., the incident surfaces 25*a* and 26*a*), and then the incident light may be reflected by the respective reflective surfaces (i.e., the reflective surfaces 25*b* and 26*b*) to form a large angle with respect to the optical axis B. Alternatively, the light incident from the second light emitting portion 10B may be refracted in a direction away from the optical axis B without being reflected by the respective reflective surfaces (i.e., the reflective surface 25*b* and the reflective surface 26*b*) and may then exit from the exit surface 20*b* of the lens 20. Similarly, in the fourth case, the light emitted from the second light emitting portion 10B is incident from, for example, the respective incident surfaces of the second convex portion 22, the third convex portion 23, and the fourth convex portion 24 (i.e., the incident surfaces 22*a*, 23*a*, and 24*a*), and then the incident light is reflected by the respective reflective surfaces (i.e., the reflective surfaces 22*b*, 23*b*, and 24*b*) to form a large angle with respect to the optical axis B. Alternatively, the light incident from the second light emitting portion 10B may be refracted in a direction away from the optical axis B without being reflected by the respective reflective surfaces (i.e., the reflective surfaces 22*b*, 23*b*, and 24*b*) and may then exit from the exit surface 20*b* of the lens 20.

As can be seen from FIG. 4F, the angle at which the light emitted from the second light emitting portion 10B is directed toward the respective convex portions (for example, the second convex portion 22 to the sixth convex portion 26) varies depending on a position of the second light emitting portion 10B with respect to each convex portion. In the end view, by way of example, an angle θ3 at which the light from the second light emitting portion 10B located on one side of the first light emitting portion 10A and close to the sixth convex portion 26 is directed to the sixth convex portion 26 is different from an angle θ4 at which the light from the second light emitting portion 10B located on the other side of the first light emitting portion 10A and farther from the sixth convex portion 26 is directed to the sixth convex portion 26. In detail, a difference between the angle θ3 and the angle θ4 is greater than a difference between the angle θ1 and the angle θ2.

Because the angle of the light directed toward the sixth convex portion 26 varies depending on the position of the second light emitting portion 10B relative to the sixth convex portion 26, this may cause variations in the angle formed between the light reflected on the reflective surface 26*b* of the sixth convex portion 26 and the optical axis B. From the same perspective, when the light emitted from the second light emitting portion 10B is directed, for example, from the second convex portion 22 to the fifth convex portion 25, this may cause variations in the angle formed between the light reflected on each reflective surface of the corresponding convex portion and the optical axis B. As a result, a proportion of the light that is emitted from the second light emitting portion 10B and is controllable via the respective convex portions of the lens 20, for example, the second convex portion 22 to the sixth convex portion 26, is less than that of the light that is emitted from the first light emitting portion 10A and is controllable via them. This means that a controllable light as intended becomes smaller because the path of the light L2 emitted from the light emitting surface of the second light emitting portion 10B is farther from the path of the light L1 emitted from the first light emitting portion 10A. When the intended light distribution is the ultra-narrow angle light distribution, it is difficult to control the light distribution to be the ultra-narrow angle light distribution, and thus the light distribution approaches the Lambertian light distribution, resulting in the narrow angle light distribution. Therefore, the second light emitting portion 10B can be used for the narrow angle light distribution control.

The angle formed between the light reflected on the reflection surface of each convex portion and the optical axis B can be adjusted to be made smaller by changing the shape, size, position and/or the like of each convex portion of the lens 20. For example, the narrow angle light distribution can be controlled by setting an angle formed between the optical axis B of the lens 20 and the reflective surface of each convex portion to be relatively larger (for example, 35 degrees or more to 50 degrees or less), compared to the wide angle light distribution.

With the configuration mentioned above, the proportion of the light that is emitted from the first light emitting portion 10A at the center of the combined body 10 and is controllable by the lens 20 is greater than the proportion of the light that is emitted from the second light emitting portion 10B provided separately from and along the outer periphery of the first light emitting portion 10A and is controllable by the lens 20. Thus, the light from the first light emitting portion 10A can be adjusted for the ultra-wide angle light distribution or ultra-narrow angle light distribution. In contrast, the proportion of the light that is emitted from the second light emitting portion 10B provided separately from and along the outer periphery of the first light emitting portion 10A and is controllable by the lens 20 is less than the proportion of the light that is emitted from the first light emitting portion 10A and is controllable by the lens 20. Thus, the light from the second light emitting portion 10B can be adjusted for the wide angle light distribution or narrow angle light distribution.

As described above, because the position of the first light emitting portion 10A with respect to the lens 20 is a position where the control of the light is easy, the light distribution of the light from the first light emitting portion 10A can be changed significantly by the lens 20. That is, a travel direction of most light emitted from the first light emitting portion 10A can be changed significantly by the lens 20. Meanwhile, because the position of the second light emitting portion 10B with respect to the lens 20 is a position where the control of the light is difficult, the light distribution of the light from the second light emitting portion 10B does not change significantly by the lens 20. That is, it is difficult to significantly change the travel direction of the light emitted from the second light emitting portion 10B by the lens 20. Thus, an amount by which the lens 20 changes a light distribution angle of the light emitted from the first light emitting portion 10A is greater than an amount by which the lens 20 changes a light distribution angle of the light emitted from the second light emitting portion 10B. According to the light source device 100 of the first embodiment, four patterns of light distribution control can be provided by utilizing such relatively different light distributions, specifically, the light distribution using the first light emitting portion 10A through the lens 20 and the light distribution using the second light emitting portion 10B through the lens 20, the four patterns including the ultra-wide angle light distribution, wide angle light distribution, ultra-narrow angle light distribution, and narrow angle light distribution. Specifically, the amount of light whose travel direction is changed in the light emitted from the first light emitting portion 10A is set relatively greater than the amount of light whose travel direction is changed in the light emitted from the second light emitting portion 10B, depending on a difference in the position, shape, and/or the like of each light emitting portion, a difference in the shape, size, position, and/or the like of each convex portion of the lens 20, thereby enabling two or more patterns of light distribution control using one lens 20 (e.g., one Fresnel lens). In more detail, the two or more patterns of light distribution control includes a control in which the light shows light distribution between two patterns of light distribution (for example, between the ultra-wide angle light distribution and the wide angle light distribution, or between the ultra-narrow angle light distribution and the narrow angle light distribution), by adjusting an output ratio of the first light emitting portion 10A to the second light emitting portion 10B, for example, by strengthening an output from one of these light emitting portions and weakening an output from the other, for example, at the same time.

The light from each of the first and second light emitting portions 10A and 10B is preferably emitted to spread in a direction away from the optical axis B of the lens 20, and then refracted by the lens 20 to travel in a direction toward the optical axis B of the lens 20. Specifically, a convex portion located on the outermost side with respect to the optical axis B (corresponding to the above sixth convex portion 26) and another convex portion adjacent thereto (corresponding to the above fifth convex portion 25) are preferably positioned outside an outer edge of the combined body 10 in the plan view such that the light from each of the first and second light emitting portions 10A and 10B can be incident into each convex portion of the lens 20 (particularly, the outermost convex portion onto which attention is to be paid, i.e., the sixth convex portion 26) in the direction away from the optical axis B of the lens 20.

Second Embodiment

Figure 5A:
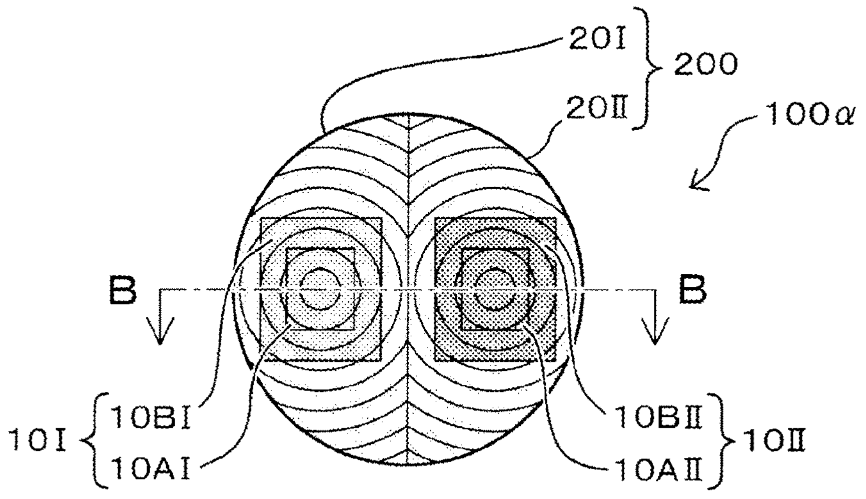
FIG. 5A is a schematic plan view illustrating a configuration of a light source device of a second embodiment.
Figure 5B:
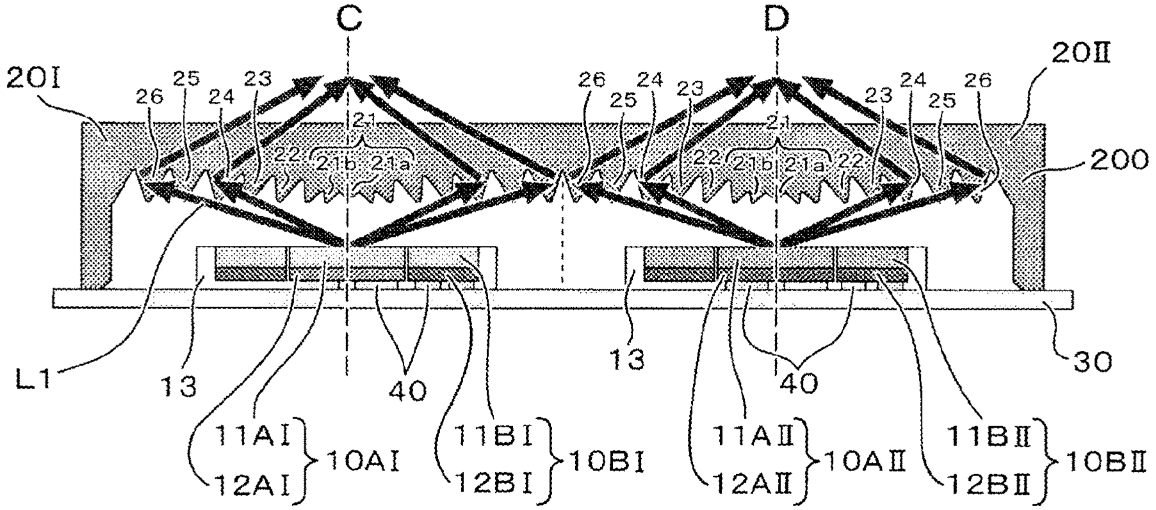
FIG. 5B is an end view taken along line B-B in FIG. 5A, schematically illustrating a state in which respective light distributions in a first light emitting portion and a third light emitting portion of respective combined bodies of light emitting portions are controlled by the respective Fresnel lenses.
Figure 5C:
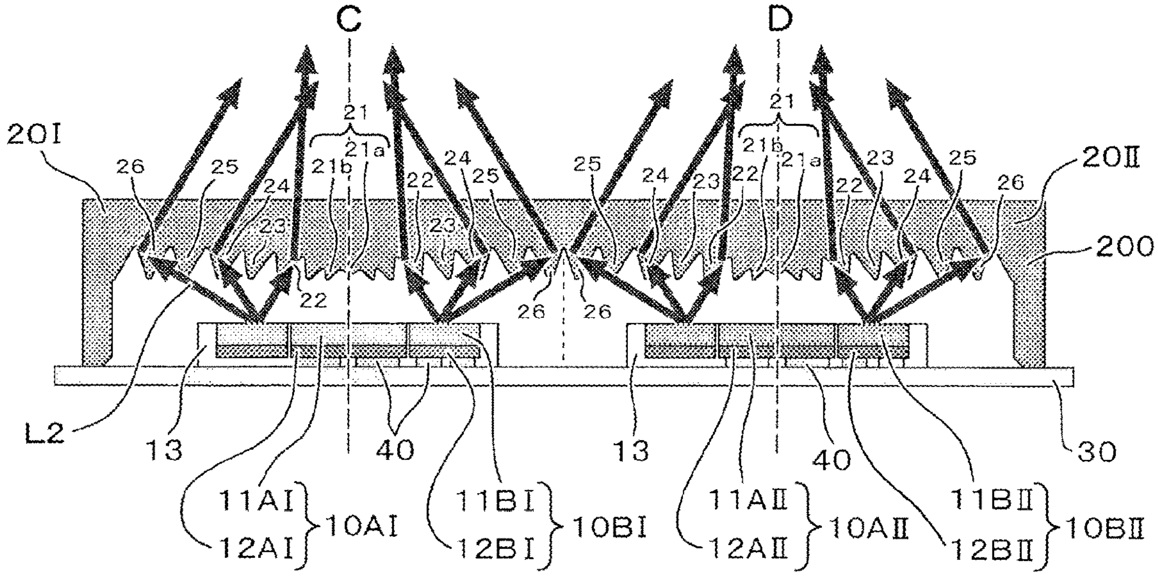
FIG. 5C is an end view taken along line B-B in FIG. 5A, schematically illustrating a state in which the respective light distributions in a second light emitting portion and a fourth light emitting portion of respective combined bodies of light emitting portions are controlled by the respective Fresnel lenses.

FIG. 5A is a plan view schematically illustrating a configuration of a light source device of a second embodiment. FIG. 5B is an end view taken along line B-B in FIG. 5A, schematically illustrating a state in which respective light distributions in a first light emitting portion and a third light emitting portion of respective combined bodies of light emitting portions are controlled by the respective Fresnel lenses. FIG. 5C is an end view taken along line B-B in FIG. 5A, schematically illustrating a state in which the respective light distributions in a second light emitting portion and a fourth light emitting portion of respective combined bodies of light emitting portions are controlled by the respective Fresnel lenses.

A light source device 100α according to a second embodiment will be described below. For the second embodiment, the contents that differ from the contents of the above first embodiment are mainly described, and a description of the contents that overlap with those of the first embodiment is omitted or simplified.

The light source device 100α of the second embodiment is configured to basically reflect the idea of the light source device 100 of the first embodiment in which the combined body 10 (hereinafter referred to as a first combined body including light emitting portions 10I) is disposed within an area of one Fresnel lens (hereinafter referred to as a first Fresnel lens 20I) as the lens 20 in the plan view. However, this light source device 100α differs from the light source device 100 of the first embodiment only in using a second combined body including light emitting portions 10II and a second lens 20II (hereinafter referred to as a second Fresnel lens 20II) in addition to the first combined body 10I and the first Fresnel lens 20I.

The light source device 100α of the second embodiment is a compound lens 200 having the first Fresnel lens 20I and the second Fresnel lens 20II (hereinafter referred to as the lens 200), the first combined body 10I corresponding to the first Fresnel lens 20I, and the second combined body 10II corresponds to the second Fresnel lens 20II. The first combined body 10I includes a first light emitting portion 10AI and a second light emitting portion 10BI provided separately from and along an outer periphery of the first light emitting portion 10AI. The first Fresnel lens 20I is disposed above the first combined body 10I to span the first light emitting portion 10AI and the second light emitting portion 10BI. That is, the first light emitting portion 10AI and the second light emitting portion 10BI (which correspond to the first combined body 10I) are disposed within an area of the first Fresnel lens 20I, and a concentric center (in other words, an optical axis C) of the first Fresnel lens substantially coincides with a center of the first light emitting portion 10AI in the plan view.

First light emitted from each of the first and second light emitting portions 10AI and 10BI has its light distribution controlled by the first Fresnel lens 20I. The second combined body 10II includes a third light emitting portion 10AII and a fourth light emitting portion 10BII provided separately from and along an outer periphery of the third light emitting portion 10AII. The second Fresnel lens 20II is disposed above the second combined body 10II to span the third light emitting portion 10AII and the fourth light emitting portion 10BII. That is, the third light emitting portion 10AII and the fourth light emitting portion 10BII (which correspond to the second combined body 10II) are disposed within an area of the second Fresnel lens 20II, and a concentric center (in other words, an optical axis D) of the second Fresnel lens 20II substantially coincides with a center of the third light emitting portion 10AII.

Second light from each of the third and fourth light emitting portions 10AII and 10BII has its light distribution controlled by the second Fresnel lens 20II. The respective third and fourth light emitting portions 10AII and 10BII emit the second light of substantially the same color. The color of the second light is different from that of the first light. The substantially same color in the present embodiment means that a color difference (equivalent to a chromaticity difference) $\Delta u'v'$ between the lights emitted from the respective light emitting portions that are referred to as the third and fourth light emitting portions is 0.05 or less.

The second combined body 10II may emit the second light of a color different from that of the first light emitted from the first combined body 10I. The second light having a different color from that of the first light in the present embodiment means a light emitted in a different color that shows a color difference Δu'v' (equivalent to a chromaticity difference) from the first light of greater than 0.05.

Hereinafter, a description will be given on an example of the light source device 100α of the second embodiment, in which the first combined body 10I includes a wavelength conversion member 11AI and a wavelength conversion member 11BI as its constituent elements, while the second combined body 10II includes a wavelength conversion member 11AII and a wavelength conversion member 11BII as its constituent elements. In this case, the wavelength conversion member 11AII and the wavelength conversion member 11BII of the second combined body 10II may include one type or a plurality of types of the above wavelength conversion members. The wavelength conversion members 11AI and 11BI of the first combined body 10I may be selected from wavelength conversion members different from the wavelength conversion members 11AII and 11BII, or a content of the wavelength conversion members 11AI and 11BI may be different from that of the wavelength conversion members 11AII and 11BII.

As in the light source device 100 of the first embodiment, according to the light source device 100α of the second embodiment, the first Fresnel lens 20I enables the light distribution control of the first light emitted from the first light emitting portion 10AI and the second light emitting portion 10BI that constitute the first combined body 10I. Thus, the first light can show two or more patterns of light distribution with the first Fresnel lens 20I.

In addition, according to the second embodiment, the second Fresnel lens 20II enables the light distribution control of the second light emitted from the third light emitting portion 10AII and the fourth light emitting portion 10BII that constitute the second combined body 10II. Thus, the second light can show two or more patterns of light distribution with the second Fresnel lens 20II in the same manner as the first light.

With the configuration mentioned above, in the light source device 100α of the second embodiment, four or more patterns of light distribution can be provided by "the first Fresnel lens 20I and the second Fresnel lens 20II" and "the first combined body 10I located in the area of the first Fresnel lens 20I and the second combined body 10II located in the area of the second Fresnel lens 20II in the plan view". That is, the first light and the second light can be controlled to show a total of four or more patterns of light distribution using the lens 200 including two Fresnel lenses. This can reduce the size of the light source device 100α and thus it can be suitably used for a smartphone. Furthermore, the two Fresnel lenses 20I and 20II having the same shape as each other make an outer contour of the lens 200 better (see FIG. 5A).

As in the first embodiment, the first combined body 10I and the second combined body 10II both exhibit the following effects when a lighting of the first light emitting portion 10AI and that of the third light emitting portion 10AII are controlled, the first and second light emitting portions 10AI, 10AII including the first light emitting elements controllable to be lit independently.

Specifically, as in the first embodiment, there is a smaller angle formed between the respective lights emitted from the light emitting surfaces of the first and third light emitting portions 10AI and 10AII, which are directed to the sixth convex portion 26 of each of the first and second Fresnel lenses 20I and 20II, and the respective light emitting surfaces of the first and third light emitting portions 10AI, 10AII. Therefore, it is possible to control an angle formed between the optical axis of the light reflected on the reflective surface of each of the sixth convex portion 26 and fifth convex portion 25 located farther from the first and third light emitting portions 10AI and 10AII and the optical axis C of the first Fresnel lens 20I or optical axis D of the second Fresnel lens 20II (hereinafter referred to an optical axis C or D of the lens 200) such that the angle approaches an desired angle in the same manner as the first embodiment. This desired angle (corresponding to a larger or smaller angle formed between the optical axis of the light reflected on the reflection surface of each convex portion and the optical axis C or D of the lens 200) can be adjusted by changing the shape, size, position and/or the like of each convex portion of the Fresnel lens, for example.

As a result, the lights emitted from the respective first and third light emitting portions 10AI and 10AII can be controlled to show the desired light distribution via the convex portions located farther from each light emitting portion, such as the fifth convex portion 25 and the sixth convex portion 26 of each of the first and second Fresnel lenses 20I and 20II. Therefore, the range irradiated with the light (referred to as the irradiation distribution) can be enlarged or narrowed by using one lens 200 having the Fresnel lenses 20I and 20II. Thus, it is possible to use the first light emitting portion 10AI and the third light emitting portion 10AII for the ultra-narrow angle light distribution control or the ultra-narrow angle light distribution control.

As in the first embodiment, the first combined body 10I and the second combined body 10II both exhibit the following effects when a lighting of the second light emitting portion 10BI and that of the fourth light emitting portion 10BII are controlled.

Specifically, as in the first embodiment, for each combined body 10I and 10II, an angle between the light ray directed toward any point on the sixth convex portion 26 and the light emitting surface of the second light emitting portion 10BI or fourth light emitting portion 10BII (which means the above angle θ3 or θ4) varies due to a positional relationship between the second light emitting portion 10BI and the sixth convex portion 26 of the lens 20I as well as a positional relationship between the fourth light emitting portion 10BII and the sixth convex portion 26 of the lens 20II. Consequently, an angle formed between the light reflected on the reflective surface of the sixth convex portion 26 and the optical axis C or D of the lens 200 becomes larger or smaller than the target angle. From the same perspective, when the light emitted from each of the second and fourth light emitting portions 10BI, 10BII is directed toward from the second convex portion 22 to the fifth convex portion 25, the angle formed between the light reflected on the reflective surface of the corresponding convex portion and the optical axis C or D of the lens 200 becomes larger or smaller than the desired angle. As a result, a proportion of the light that is emitted from the second and fourth light emitting portions 10BI and 10BII and is controllable via the respective corresponding convex portions of the first Fresnel lens 20I and the second Fresnel lens 20II, for example, the second convex portion 22 to the sixth convex portion 26, is less than a proportion of the light emitted from the first and third light emitting portions 10AI and 10AII and is controllable via them. Therefore, the second light emitting portion 10BI and the fourth light emitting portion 10BII can be used for the wide angle light distribution control or narrow angle light distribution control.

With the configuration mentioned above, according to the light source device 100α of the second embodiment, the wide angle light distribution control and the ultra-wide angle light distribution control or narrow angle light distribution control and the ultra-narrow angle light distribution control of the first light can be made by one first Fresnel lens 20I, depending on the positional relationship and/or the like between the first Fresnel lens 20I and two light emitting portions (for example, the first light emitting portion 10AI and the second light emitting portion 10BI). Furthermore, the wide angle light distribution control and the ultra-wide angle light distribution control or the narrow angle light distribution control and the ultra-narrow angle light distribution control of the second light can be made by one second Fresnel lens 20II, depending on the positional relationship and/or the like between the second Fresnel lens 20II and two light emitting portions (for example, the third light emitting portion 10AII and the fourth light emitting portion 10BII).

That is, in the second embodiment, due to one compound lens composed of two Fresnel lenses, a total of four or more patterns of light distribution can be controlled with the first light emitted from the two light emitting portions constituting the first combined body 10I and the second light emitted from the two light emitting portions constituting the second combined body 10II.

<Method of Manufacturing Light Source Device>

A method of manufacturing a light source device according to the embodiment of the present invention will be described below.

The method of manufacturing a light source device of the embodiment of the present invention includes a first step of providing a combined body including light emitting portions on a substrate having a wiring (hereinafter referred to as a wiring substrate), and a second step of providing a lens above the combined body to span a first light emitting portion and a second light emitting portion of the combined body.

Specifically, in the first step, the combined body is provided on the wiring substrate such that the wiring of the wiring substrate and a pair of electrodes provided on each light emitting element of the respective light emitting portions in the combined body face each other, and that the respective light emitting elements are controllable to be lit independently. In the second step, the lens is provided above the combined body such that each light emitting portion and a plurality of convex portions of the Fresnel lens are separated and face each other. Through these steps, the light source device of the embodiment of the present invention can be manufactured.

Production processes of the above combined body, which is a constituent element of the light source device, will be described below. The following three examples of the production processes of the combined body are shown below (see FIGS. 6A to 6O, FIGS. 7A to 7M, and FIGS. 8A to 8R). These figures show an embodiment in which a plurality of portions serving as the second light emitting elements are separated from each other and disposed to surround a portion serving as the first light emitting portion. However, the combined body is not limited thereto and may be configured such that a portion serving as a second light emitting portion including one second light emitting element may be disposed to surround the portion serving as the first light emitting portion.

Production Example 1 of Combined Body Including Light Emitting Portions

Figure 6A:
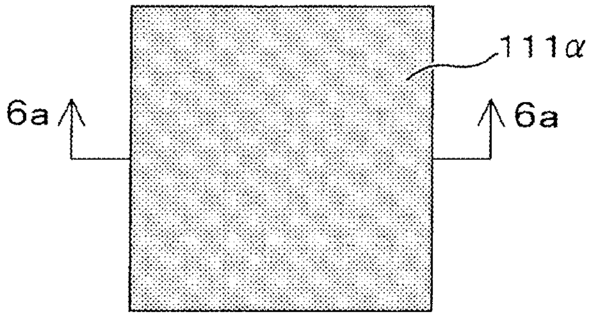
FIG. 6A is a plan view schematically illustrating a preparation step of a wavelength conversion member sheet.
Figure 6B:
FIG. 6B is an end view taken along line 6*a*-6*a* in FIG. 6A, schematically illustrating the preparation step of the wavelength conversion member sheet.
Figure 6C:
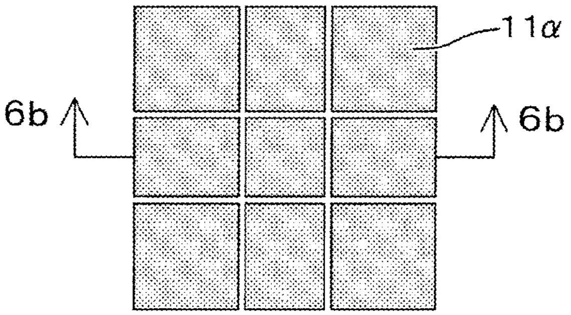
FIG. 6C is a plan view schematically illustrating a singulation step of the wavelength conversion member sheet.
Figure 6D:
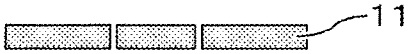
FIG. 6D is an end view taken along line 6*b*-6*b* in FIG. 6C, schematically illustrating the singulation step of the wavelength conversion member sheet.
Figure 6E:
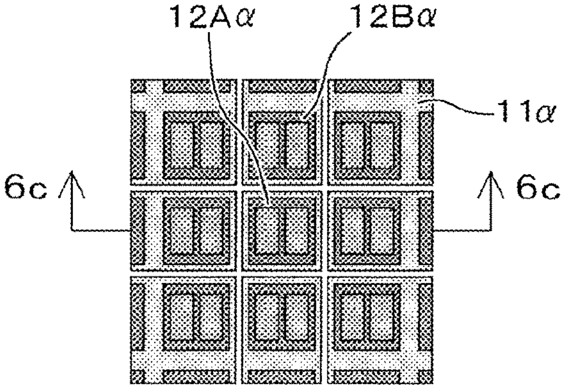
FIG. 6E is a plan view schematically illustrating a mounting step of light emitting elements.
Figure 6F:
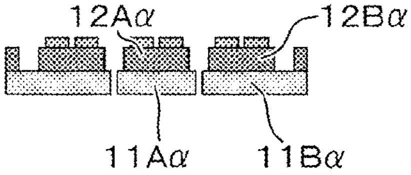
FIG. 6F is an end view taken along line 6*c*-6*c* in FIG. 6E, schematically illustrating the mounting step of the light emitting elements.
Figure 6G:
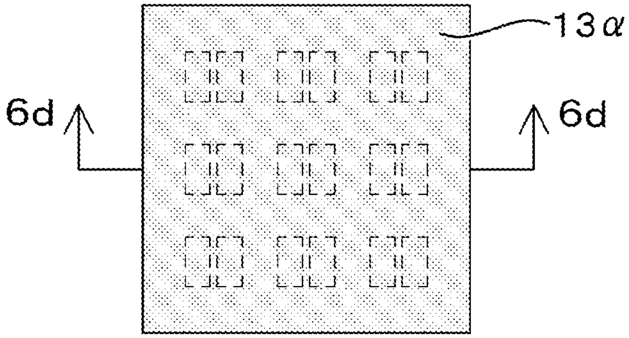
FIG. 6G is a plan view schematically illustrating a supplying step of a reflective member material.
Figure 6H:
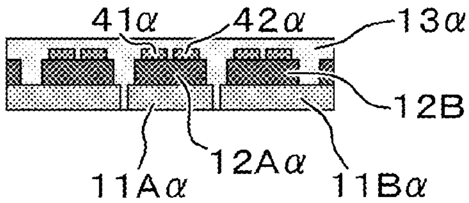
FIG. 6H is an end view taken along line 6*d*-6*d* in FIG. 6G, schematically illustrating the supplying step of the reflective member material.
Figure 6I:
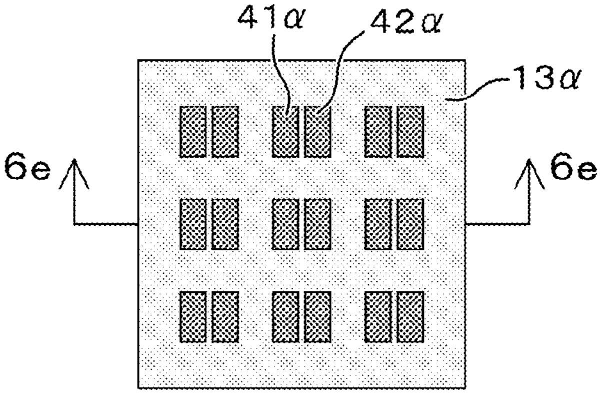
FIG. 6I is a plan view schematically illustrating a grinding step of the reflective member material.
Figure 6J:
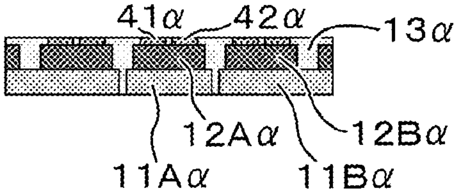
FIG. 6J is an end view taken along line 6*e*-6*e* in FIG. 6I, schematically illustrating the grinding step of the reflective member material.
Figure 6K:
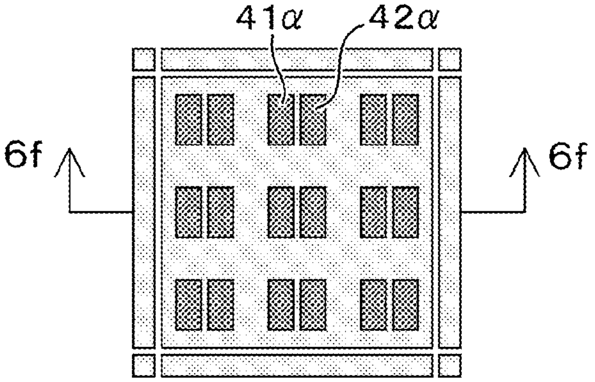
FIG. 6K is a plan view schematically illustrating a dicing step.
Figure 6L:
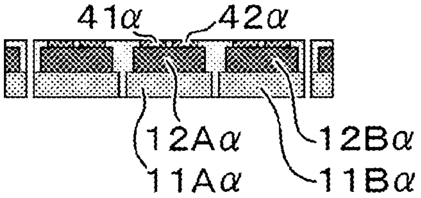
FIG. 6L is an end view taken along line 6*f*-6*f* in FIG. 6K, schematically illustrating the dicing step.
Figure 6M:
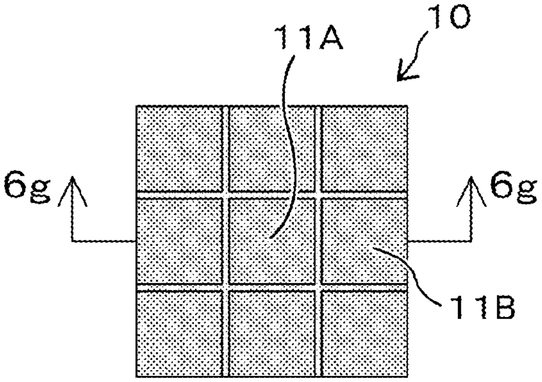
FIG. 6M is a plan view schematically illustrating a resulting combined body including light emitting portions.
Figure 6N:
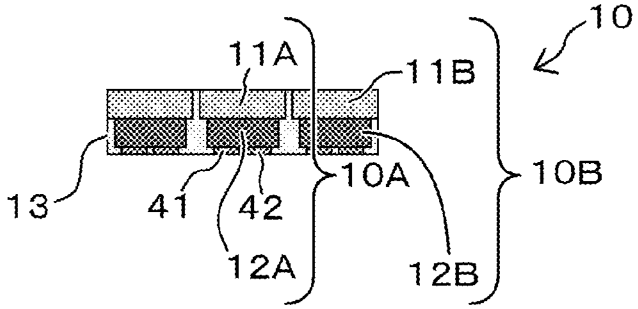
FIG. 6N is an end view taken along line 6*g*-6*g* in FIG. 6M, schematically illustrating the resulting combined body.
Figure 6O:
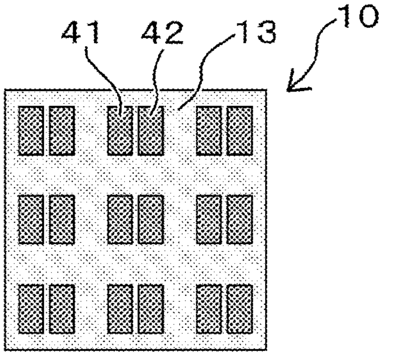
FIG. 6O is a bottom view schematically illustrating the resulting combined body.

Firstly, a wavelength conversion member sheet 111α is prepared (see FIGS. 6A and 6B). The wavelength conversion member sheet 111α is singulated into a plurality of quadrilateral (rectangular or square) wavelength conversion member sheets 11α by a dicing process (see FIGS. 6C and 6D). Then, a first light emitting element 12Aα and a second light emitting element 12Bα are disposed on the respective quadrilateral wavelength conversion member sheets 11α such that each wavelength conversion member sheet 11α faces a light emitting surface of the first light emitting element 12Aα and that of the second light emitting element 12Bα (see FIGS. 6E and 6F). After disposing the first and second light emitting elements 12Aα and 12Bα, a reflective member material 13α is formed to cover lateral surfaces of all of the light emitting elements and electrodes (see FIGS. 6G and 6H). After curing the reflective member material 13α, the reflective member material 13α is ground to expose a pair of electrodes 41α and 42α disposed on each light emitting element. Finally, the reflective member material 13α is singulated by dicing into pieces with a desired shape (see FIGS. 6K and 6L). Through these steps, a combined body including light emitting portions 10 including a first light emitting portion 10A and a second light emitting portion 10B can be produced (see FIGS. 6M to 6O).

Production Example 2 of Combined Body Including Light Emitting Portions

Figure 7A:
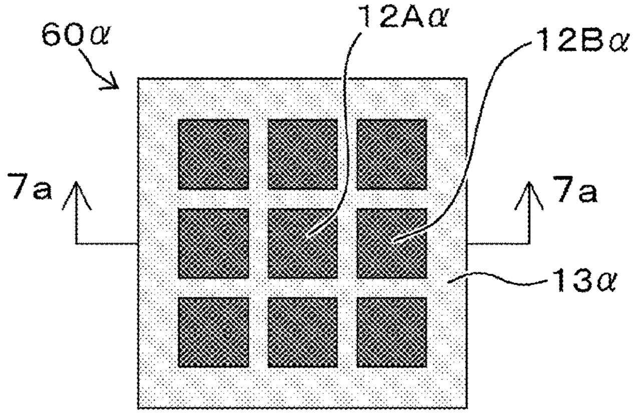
FIG. 7A is a plan view schematically illustrating a preparation step of a plate with an aggregate of light emitting elements that have their lateral surfaces covered with the reflective member material.
Figure 7B:
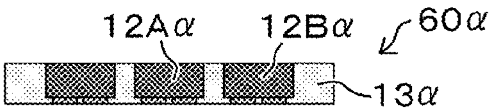
FIG. 7B is an end view taken along line 7*a*-7*a* in FIG. 7A, schematically illustrating the preparation step of the plate with the aggregate of the light emitting elements that have their lateral surfaces covered with the reflective member material.
Figure 7C:
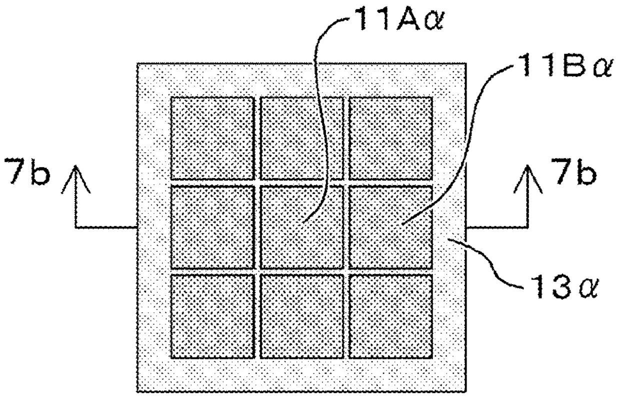
FIG. 7C is a plan view schematically illustrating an installation step of phosphor-containing blocks.
Figure 7D:
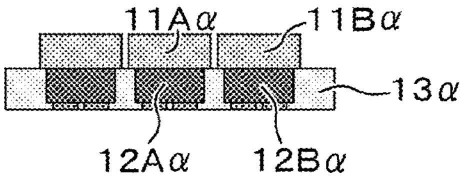
FIG. 7D is an end view taken along line 7*b*-7*b* in FIG. 7C, schematically illustrating the installation step of the phosphor-containing blocks.
Figure 7E:
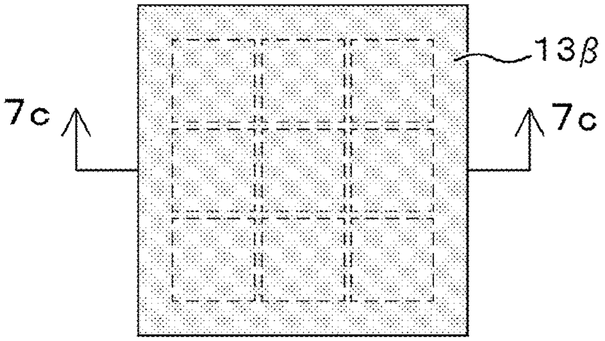
FIG. 7E is a plan view schematically illustrating a supplying step of a reflective member material.
Figure 7F:
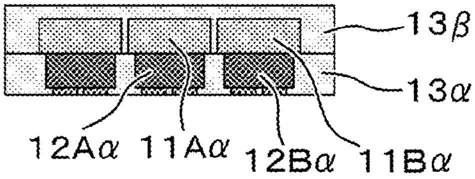
FIG. 7F is an end view taken along line 7*c*-7*c* in FIG. 7E, schematically illustrating the supplying step of the reflective member material.
Figure 7G:
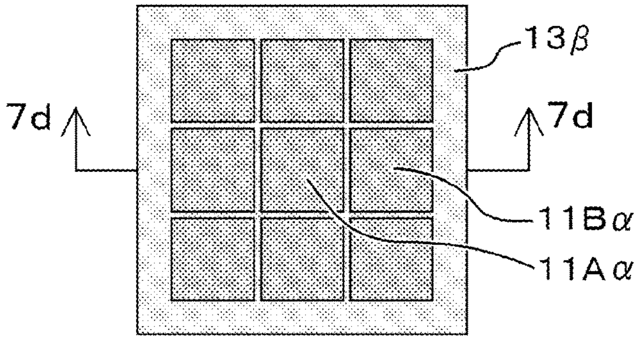
FIG. 7G is a plan view schematically illustrating a grinding step of the reflective member material.
Figure 7H:
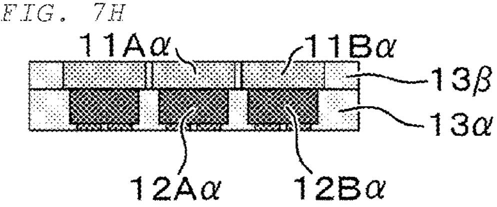
FIG. 7H is an end view taken along line 7*d*-7*d* in FIG. 7G, schematically illustrating the grinding step of the reflective member material.
Figure 7I:
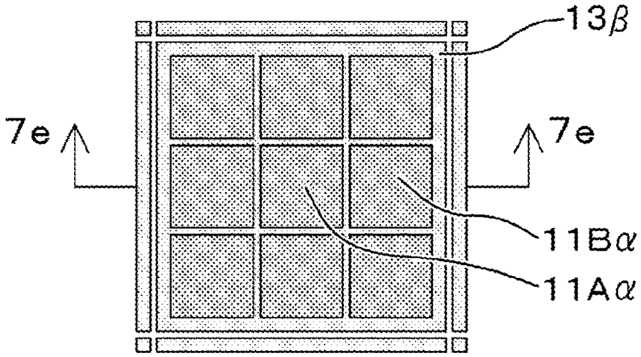
FIG. 7I is a plan view schematically illustrating a dicing step.
Figure 7J:
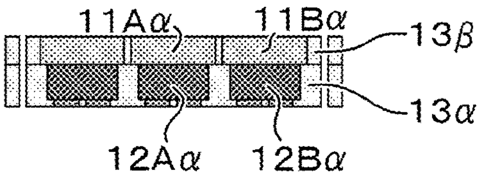
FIG. 7J is an end view taken along line 7*e*-7*e* in FIG. 7I, schematically illustrating the dicing step.
Figure 7K:
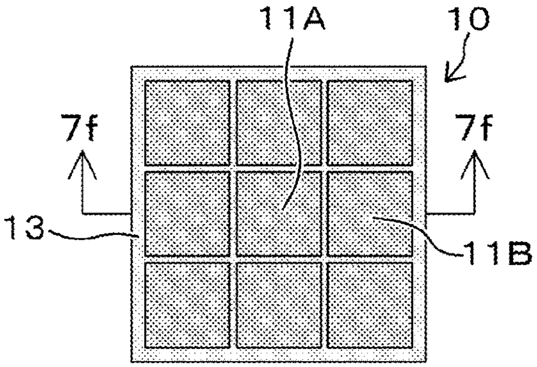
FIG. 7K is a plan view schematically illustrating a resulting combined body including light emitting portions.
Figure 7L:
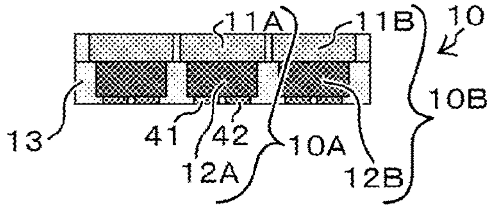
FIG. 7L is an end view taken along line 7*f*-7*f* in FIG. 7K, schematically illustrating the resulting combined body.
Figure 7M:
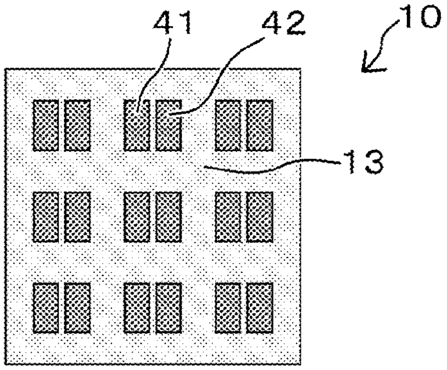
FIG. 7M is a schematic bottom view schematically illustrating the resulting combined body.

Firstly, a plate 60α including an aggregate of the first light emitting element 12Aα and the second light emitting elements 12Bα, which have their lateral surfaces covered with the reflective member material 13α, is prepared (see FIGS. 7A and 7B). Then, a phosphor-containing block 11Aα as the wavelength conversion member is disposed to face the light emitting surface of the first light emitting element 12Aα, and a phosphor-containing block 11Bα as the wavelength conversion member is disposed to face the light emitting surface of the second light emitting element 12Bα (see FIGS. 7C and 7D). After disposing the phosphor-containing blocks, respective lateral surfaces and top surfaces of the phosphor-containing blocks are covered with a reflective member material 13β (see FIGS. 7E and 7F). Then, after curing the reflective member material 13β, the reflective member material 13β is ground to expose the respective top surfaces of the phosphor-containing blocks 11Aα and 11Bα (see FIGS. 7G and 7H). Finally, the reflective member materials 13α and 13β are singulated by dicing into pieces with a desired shape (see FIGS. 7I and 7J). Through these steps, the combined body 10 including the first light emitting portion 10A and the second light emitting portion 10B can be produced (see FIGS. 7K to 7M).

Production Example 3 of Combined Body Including Light Emitting Portions

Figure 8A:
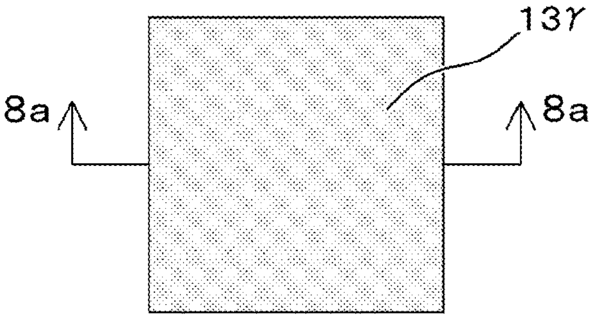
FIG. 8A is a plan view schematically illustrating a preparation step of a reflective member plate.
Figure 8B:
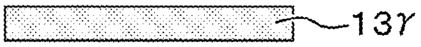
FIG. 8B is an end view taken along line 8*a*-8*a* in FIG. 8A, schematically illustrating the preparation step of the reflective member plate.
Figure 8C:
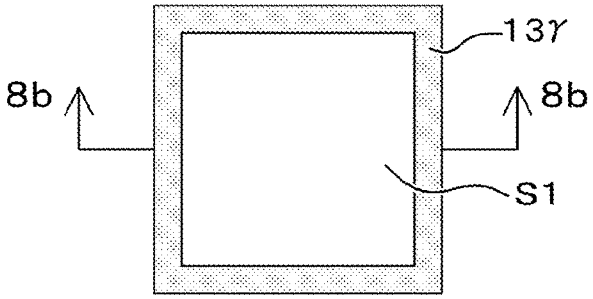
FIG. 8C is a plan view schematically illustrating a punching step of the reflective member plate.
Figure 8D:
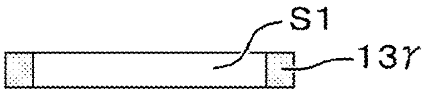
FIG. 8D is an end view taken along line 8*b*-8*b* in FIG. 8C, schematically illustrating the punching step of the reflective member plate.
Figure 8E:
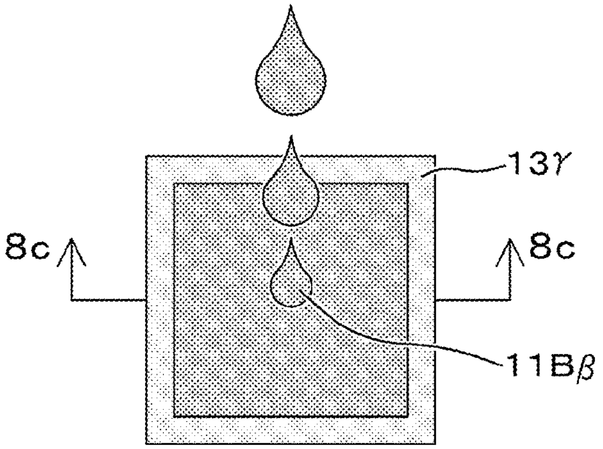
FIG. 8E is a plan view schematically illustrating a supplying step of a phosphor-containing resin material.
Figure 8F:
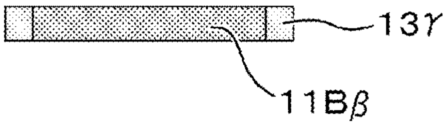
FIG. 8F is an end view taken along line 8*c*-8*c* in FIG. 8E, schematically illustrating the supplying step of the phosphor-containing resin material.
Figure 8G:
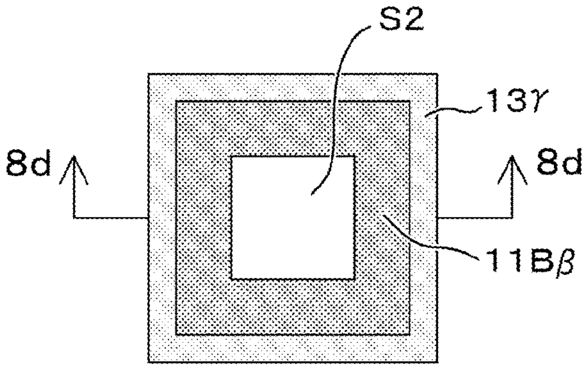
FIG. 8G is a plan view schematically illustrating a punching step of the phosphor-containing resin material.
Figure 8H:
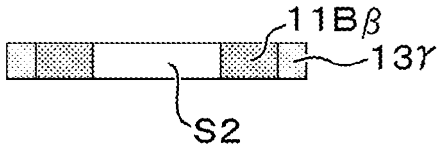
FIG. 8H is an end view taken along line 8*d*-8*d* in FIG. 8G, schematically illustrating the punching step of the phosphor-containing resin material.
Figure 8I:
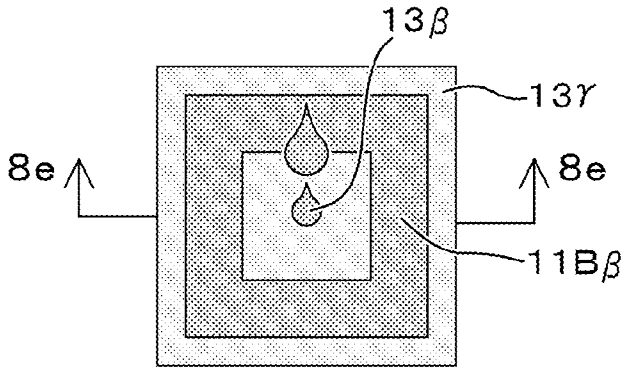
FIG. 8I is a plan view schematically illustrating a supplying step of a reflective member material.
Figure 8J:
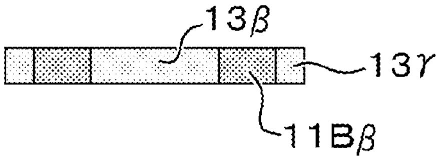
FIG. 8J is an end view taken along line 8*e*-8*e* in FIG. 8I, schematically illustrating the supplying step of the reflective member material.
Figure 8K:
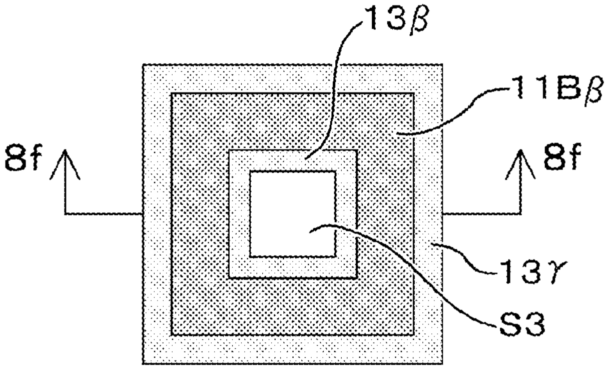
FIG. 8K is a plan view schematically illustrating a punching step of the reflective member material.
Figure 8L:
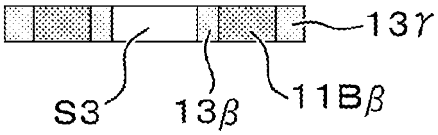
FIG. 8L is an end view taken along line 8*f*-8*f* in FIG. 8K, schematically illustrating the punching step of the reflective member material.
Figure 8M:
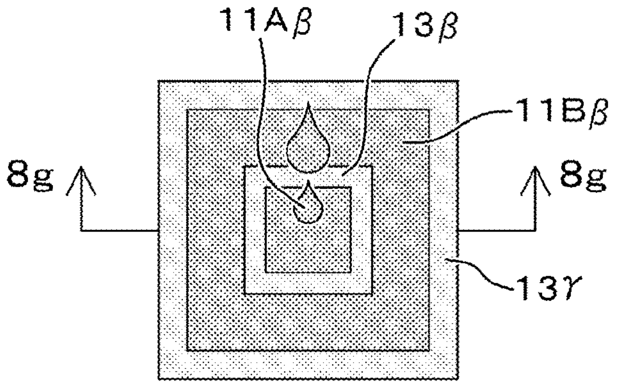
FIG. 8M is a plan view schematically illustrating a supplying step of a phosphor-containing resin material.
Figure 8N:
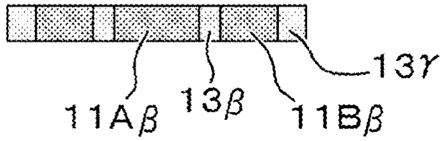
FIG. 8N is an end view taken along line 8*g*-8*g* in FIG. 8M, schematically illustrating the supplying step of the phosphor-containing resin material.
Figure 8O:
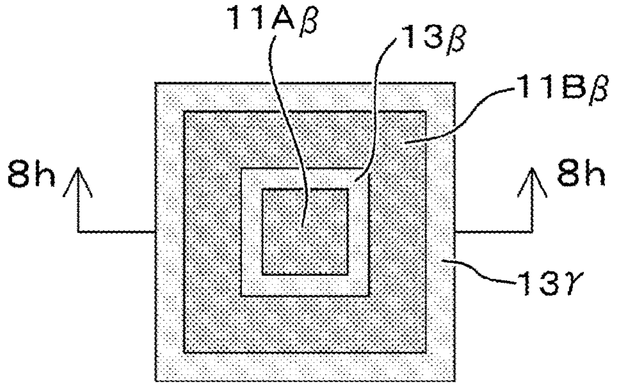
FIG. 8O is a plan view schematically illustrating an installation step of a plate with an aggregate of emitting elements that have their lateral surfaces covered with the reflective member material.
Figure 8P:
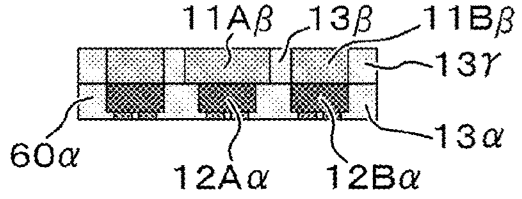
FIG. 8P is an end view taken along line 8*h*-8*h* in FIG. 8O, schematically illustrating the installation step of the plate with the aggregate of the light emitting elements that have their lateral surfaces covered with the reflective member material.
Figure 8Q:
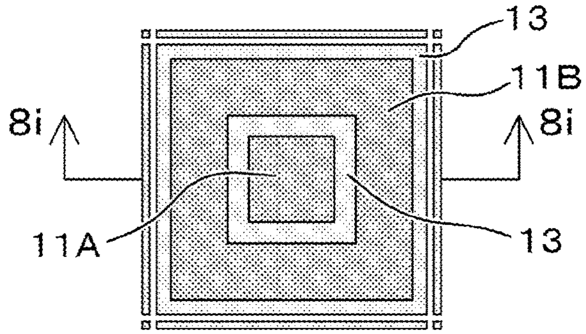
FIG. 8Q is a plan view schematically illustrating a dicing step.
Figure 8R:
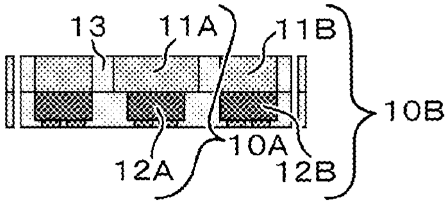
FIG. 8R is an end view taken along line 8*i*-8*i* in FIG. 8Q, schematically illustrating the dicing step.

Firstly, a reflective member plate 13γ is prepared (see FIGS. 8A and 8B). After preparing the reflective member plate 13γ, a part of the reflective member plate 13γ is punched out to form a through hole S1 (see FIGS. 8C and 8D). After the punching, the formed through hole S1 is filled with a phosphor-containing resin material 11Bβ by, for example, a potting method (see FIGS. 8E and 8F). Then, after curing the phosphor-containing resin material 11Bβ, a part of the phosphor-containing resin material 11Bβ is punched out to form a through hole S2 (see FIGS. 8G and 8H). After the punching, the formed through hole S2 is filled with the reflective member material 13β (see FIGS. 8I and 8J). Then, after curing the reflective member material 13β, a part of the reflective member plate 13β is punched out to form a through hole S3 (see FIGS. 8K and 8L). After the punching, the formed through hole S3 is filled with a phosphor-containing resin material 11Aβ and cured (see FIGS. 8M and 8N). Thereafter, a plate 60α including an aggregate of the first light emitting element 12Aα and the second light emitting elements 12Bα, which have their lateral surfaces covered with a reflective member material 13α, is disposed to directly face the cured portion of the phosphor-containing resin material 11Aβ and the cured portion of the phosphor-containing resin material 11Bβ, respectively (see FIGS. 8O and 8P). Finally, the reflective member materials 13α and the reflective member plate 13γ are cut by dicing into pieces with a desired shape (see FIGS. 8Q and 8R). Through these steps, the combined body including the first light emitting portion 10A and the second light emitting portion 10B can be produced.

While embodiments of the present invention have been described above, these embodiments are illustrative only and interpreted as typical examples that fall within the range of possible embodiments of the present invention. Therefore, the present invention is not limited to the described embodiments, and various modifications and changes can be made without departing from the spirit and scope of the present invention.

The light source devices of the described embodiments can be suitably used for a lighting, a camera flash, an automotive headlight, etc. However, the light source devices of the embodiments are not limited to these applications.

What is claimed is:

1. A light source device comprising:

a combined body comprising light emitting portions including:

a first light emitting portion comprising a first light emitting element, and a second light emitting portion provided separately from and along an outer periphery of the first light emitting portion in a plan view, the second light emitting portion comprising a plurality of second light emitting elements; and a lens disposed above the combined body; wherein:

the first light emitting element and the plurality of second light emitting elements are arrayed in first and second directions that are perpendicular to each other, the first light emitting element and the plurality of second light emitting elements are controllable to be lit independently, each of the second light emitting elements has a first edge that directly faces a first adjacent one of the second light emitting elements, and a second edge that directly faces a second adjacent one of the second light emitting elements, such that the second light emitting elements collectively surround the first light emitting portion, and the light source device is configured such that a light output of the first light emitting portion and a light output of the second light emitting portion are adjustable, and the light source device is configured to operate in a mode in which both the first light emitting portion and the second light emitting portion output light, and the light output from one of the first light emitting portion or the second light emitting portion is greater than the light output of the other of the first light emitting portion or the second light emitting portion.

2. The light source device according to claim 1, further comprising at least one wavelength conversion member located on light emitting surface sides of the second light emitting elements, wherein the at least one wavelength conversion member surrounds the outer periphery of the first light emitting portion.

3. The light source device according to claim 1, further comprising at least one wavelength conversion member, the at least one wavelength conversion member comprising a first wavelength conversion member disposed on light emitting surface sides of the plurality of second light emitting elements.

4. The light source device according to claim 1, wherein the combined body is disposed within an area of the lens in the plan view.

5. The light source device according to claim 1, wherein the lens is configured such that an amount by which the lens changes a light distribution angle of the light emitted from the first light emitting portion is greater than an amount by which the lens changes a light distribution angle of the light emitted from the second light emitting portion.

6. The light source device according to claim 1, wherein a color difference Δu'v' between the light emitted from the first light emitting portion and the light emitted from the second light emitting portion in a CIE 1976 (L*, u*, v*) color space is 0.05 or less.

7. The light source device according to claim 1, wherein the lens is a Fresnel lens.

8. The light source device according to claim 1, wherein the combined body further comprises a reflective member disposed on lateral surfaces of each of the first light emitting element and the plurality of second light emitting elements.

9. The light source device according to claim 1, wherein the light source device is a flash light source.

10. The light source device according to claim 1, wherein exactly one lens, which is said lens, is disposed above the combined body, exactly one combined body, which is said combined body, is disposed below said lens, and an optical axis of the lens overlaps the first light emitting portion.

11. The light source device according to claim 10, wherein the lens has an incident surface in which light emitted from the combined body enters and an exit surface from which the light exits, the exit surface having a flat shape.

12. The light source device according to claim 1, wherein the light source device is configured to operate in two or more of a ultra-wide angle light distribution mode, a wide angle light distribution mode, a ultra-narrow angle light distribution mode, and a narrow angle light distribution mode.

13. A light source device comprising:

a combined body comprising light emitting portions including:

a first light emitting portion comprising a first light emitting element, and a second light emitting portion provided separately from and along an outer periphery of the first light emitting portion in a plan view, the second light emitting portion comprising a plurality of second light emitting elements; and a lens disposed above the combined body; wherein:

the first light emitting element and the plurality of second light emitting elements are arrayed in first and second directions that are perpendicular to each other, the first light emitting element and the plurality of second light emitting elements are controllable to be lit independently, and the light source device is configured such that a light output of the first light emitting portion and a light output of the second light emitting portion are adjustable, and the light source device is configured to switch operation between (i) a first light distribution irradiation mode, and (ii) a second light distribution irradiation mode that has a wider light distribution than the first light distribution irradiation mode.

14. The light source device according to claim 13, wherein the light source device is configured to switch operation between the first light distribution irradiation mode and the second light distribution irradiation mode by increasing an output of one of the first light emitting portion or the second light emitting portion while decreasing an output of the other of the first light emitting portion or the second light emitting portion.

15. The light source device according to claim 13, further comprising at least one wavelength conversion member located on light emitting surface sides of the second light emitting elements, wherein the at least one wavelength conversion member surrounds the outer periphery of the first light emitting portion.

16. The light source device according to claim 13, further comprising at least one wavelength conversion member, the at least one wavelength conversion member comprising a first wavelength conversion member disposed on light emitting surface sides of the plurality of second light emitting elements.

17. The light source device according to claim 13, wherein the combined body is disposed within an area of the lens in the plan view.

18. The light source device according to claim 13, wherein the lens is configured such that an amount by which the lens changes a light distribution angle of the light emitted from the first light emitting portion is greater than an amount by which the lens changes a light distribution angle of the light emitted from the second light emitting portion.

19. The light source device according to claim 13, wherein a color difference Δu'v' between the light emitted from the first light emitting portion and the light emitted from the second light emitting portion in a CIE 1976 (L*, u*, v*) color space is 0.05 or less.

20. The light source device according to claim 13, wherein the lens is a Fresnel lens.

* * * * *